(12) United States Patent
Huxham et al.

(10) Patent No.: US 9,928,513 B2
(45) Date of Patent: Mar. 27, 2018

(54) DYNAMIC OBJECT TAG AND SYSTEMS AND METHODS RELATING THERETO

(71) Applicant: Visa International Service Association, San Francisco, CA (US)

(72) Inventors: Horatio Nelson Huxham, Cape Town (ZA); Alan Joseph O'Regan, Cape Town (ZA); Ian Phillip Bester, Cape Town (ZA); Tara Anne Moss, Cape Town (ZA)

(73) Assignee: Visa International Service Association, San Francisco, CA (US)

( * ) Notice: Subject to any disclaimer, the term of this patent is extended or adjusted under 35 U.S.C. 154(b) by 336 days.

(21) Appl. No.: 14/428,310

(22) PCT Filed: Sep. 20, 2013

(86) PCT No.: PCT/IB2013/058700
§ 371 (c)(1),
(2) Date: Mar. 13, 2015

(87) PCT Pub. No.: WO2014/045236
PCT Pub. Date: Mar. 27, 2014

(65) Prior Publication Data
US 2015/0254677 A1    Sep. 10, 2015

(30) Foreign Application Priority Data

Sep. 21, 2012  (ZA) .................................. 2012/07105
Nov. 2, 2012   (ZA) .................................. 2012/08256
(Continued)

(51) Int. Cl.
*G06Q 30/00* (2012.01)
*G06K 19/07* (2006.01)
(Continued)

(52) U.S. Cl.
CPC ......... *G06Q 30/0185* (2013.01); *G06F 21/10* (2013.01); *G06F 21/72* (2013.01);
(Continued)

(58) Field of Classification Search
CPC ........... G06Q 30/0185; G06Q 30/0225; G06Q 30/0269; G06F 21/10; G06F 21/72;
(Continued)

(56) References Cited

U.S. PATENT DOCUMENTS 5,796,832 A    8/1998  Kawan
7,126,481 B2   10/2006 Vesikivi et al.
(Continued)

FOREIGN PATENT DOCUMENTS

WO    WO03/050734 A1    6/2003
WO    WO03/060752 A1    7/2003
(Continued)

OTHER PUBLICATIONS

Lee et al. (Design of Ubiquitous Referral Marketing: A Business Model and Method, EC-Web 2006, LNCS 4082, pp. 102-111, 2006).*
(Continued)

*Primary Examiner* — Oleg Korsak
(74) *Attorney, Agent, or Firm* — Kilpatrick Townsend & Stockton LLP

(57) ABSTRACT

A dynamic object tag for a product and systems and methods relating thereto is disclosed. The dynamic object tag comprises a hardware security module, including an electronic storage module, and a communication module for communicating with an interrogation device. The hardware security module is adapted to establish a secure communication channel with the interrogation device, to exchange dynamic authentication parameters with the interrogation device, and to communicate product information stored on the electronic (Continued)

storage module to the interrogation device over the secure communication channel.

27 Claims, 18 Drawing Sheets

(30) Foreign Application Priority Data

| | | | |
|---|---|---|---|
| Nov. 27, 2012 | (ZA) | ................................ | 2012/08932 |
| Dec. 10, 2012 | (ZA) | ................................ | 2012/09320 |
| Dec. 20, 2012 | (ZA) | ................................ | 2012/09668 |

(51) Int. Cl.

| | |
|---|---|
| *G06K 19/073* | (2006.01) |
| *G07G 3/00* | (2006.01) |
| *G06Q 30/02* | (2012.01) |
| *G06F 21/10* | (2013.01) |
| *G06F 21/72* | (2013.01) |
| *G06F 21/73* | (2013.01) |
| *H04L 29/06* | (2006.01) |
| *H04W 12/06* | (2009.01) |

(52) U.S. Cl.
CPC ........... *G06F 21/73* (2013.01); *G06K 19/073* (2013.01); *G06K 19/0709* (2013.01); *G06Q 30/0225* (2013.01); *G06Q 30/0269* (2013.01); *G07G 3/003* (2013.01); *H04L 63/0492* (2013.01); *H04L 63/08* (2013.01); *G06F 2221/2111* (2013.01); *G06Q 2220/16* (2013.01); *H04L 63/0838* (2013.01); *H04W 12/06* (2013.01)

(58) Field of Classification Search
CPC .. G06F 21/73; G06K 19/0709; G06K 19/073; G07G 3/003; H04L 63/0492; H04L 63/08
See application file for complete search history.

(56) References Cited

U.S. PATENT DOCUMENTS

| | | | |
|---|---|---|---|
| 7,135,973 B2 | 11/2006 | Kittel et al. | |
| 7,174,277 B2 | 2/2007 | Vock et al. | |
| 7,209,042 B2 | 4/2007 | Martin et al. | |
| 7,319,397 B2 | 1/2008 | Chung et al. | |
| 7,417,713 B2 | 8/2008 | Smith et al. | |
| 7,791,489 B2 * | 9/2010 | Gelbman | G06K 7/10079 235/375 |
| 8,160,934 B2 | 4/2012 | Carlson et al. | |
| 8,610,538 B2 | 12/2013 | Loh et al. | |

| | | |
|---|---|---|
| 2002/0117544 A1 | 8/2002 | Wolf et al. |
| 2002/0167500 A1 | 11/2002 | Gelbman |
| 2004/0066296 A1 | 4/2004 | Atherton |
| 2005/0148828 A1 | 7/2005 | Lindsay |
| 2005/0149387 A1 | 7/2005 | O'Shea et al. |
| 2005/0171898 A1 | 8/2005 | Bishop et al. |
| 2006/0214789 A1 | 9/2006 | Posamentier et al. |
| 2007/0109124 A1 | 5/2007 | Park et al. |
| 2008/0072051 A1 | 3/2008 | Kaabouch et al. |
| 2009/0106824 A1 | 4/2009 | Morel et al. |
| 2009/0315670 A1 | 12/2009 | Naressi et al. |
| 2010/0052908 A1 | 3/2010 | Doan et al. |
| 2010/0052909 A1 | 3/2010 | Doan et al. |
| 2012/0123837 A1 | 5/2012 | Wiesner |
| 2012/0128240 A1 | 5/2012 | Rothaschild |

FOREIGN PATENT DOCUMENTS

| | | |
|---|---|---|
| WO | WO2006/110324 A2 | 10/2006 |
| WO | WO2006110624 A2 | 10/2006 |
| WO | WO2007133164 A1 | 7/2007 |
| WO | WO2009/069971 A2 | 6/2009 |
| WO | WO2010/128515 A2 | 11/2010 |
| WO | WO2011/041189 A2 | 4/2011 |
| WO | WO2011/043861 A1 | 4/2011 |
| WO | WO2012/0162634 A1 | 11/2012 |
| WO | WO2013/028846 A1 | 2/2013 |
| WO | WO2013/040368 A1 | 3/2013 |
| WO | WO2013/082311 A1 | 6/2013 |

OTHER PUBLICATIONS

Supplementary European Search Report dated Jan. 21, 2016 in EP 13838381, 12 pages.
European Office Action dated Aug. 29, 2016 in EP Application No. 13838381.5, 5 pages.
"Memory Spot," HP product sheet, 2009, [online], [retrieved on Mar. 4, 2015], retrieved from the Internet: <URL: http://www.hpl.hp.com/news/memory_spot.html>, 2 pages.
"HP Memory spot chip," Wikipedia 2014, [online], retrieved on Mar. 4, 2015], retrieved from the Internet: <URL: http://en.wikipedia.org/wiki/HP_Memory_spot_chip>, 2 pages.
McDonnell, J. T. Edward, et al., "Memory Spot: A Labeling Technology," Pervasive Computing, IEEE CS, Apr./Jun. 2010, [online], retrieved from the Internet: <URL: https://www.cs.cmu.edu/~15-821/CDROM/PAPERS/mcdonnell2010.pdf>, 7 pages.
International Search Report dated Mar. 12, 2014 in PCT/IB2013/058700, 6 pages.
Patent Examination Report No. 1 in Australian Patent Application No. 2013319831, dated Nov. 30, 2015, 4 pages.
Patent Examination Report No. 2 in Australian Patent Application No. 2013319831, dated Jun. 24, 2016, 7 pages.

* cited by examiner

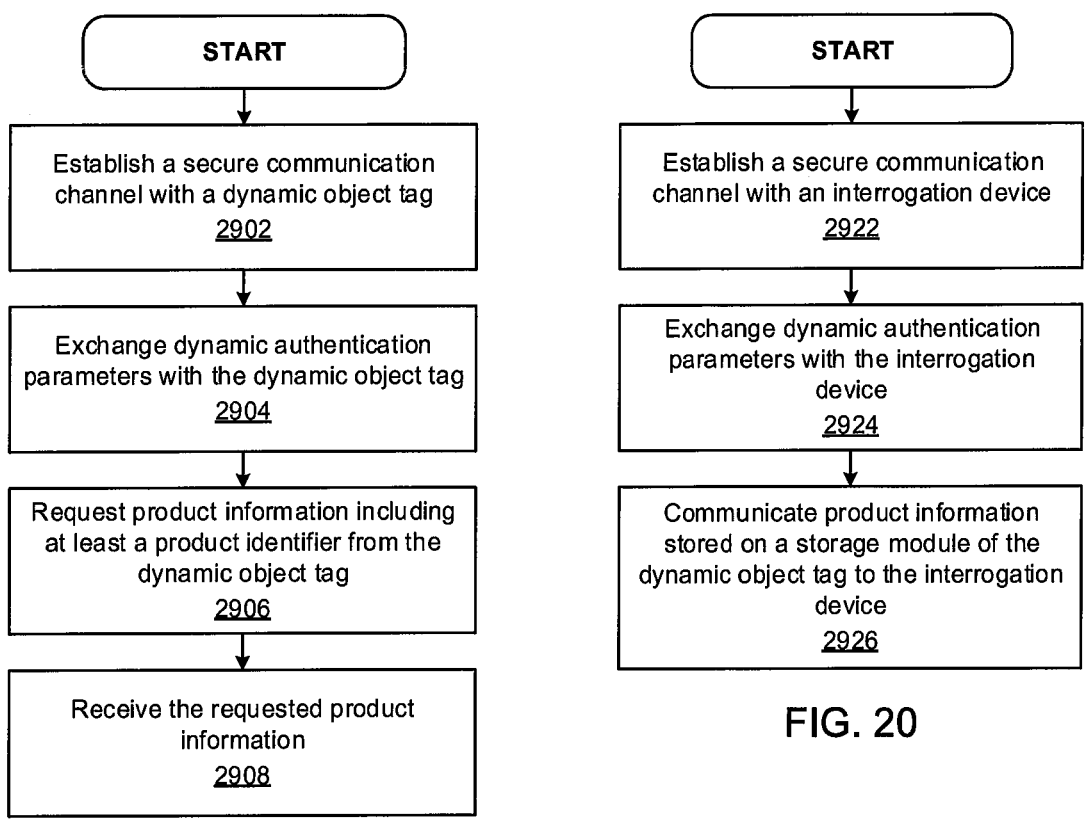

DYNAMIC OBJECT TAG AND SYSTEMS AND METHODS RELATING THERETO

This application is a National Stage of International Application No. PCT/IB2013/058700, International Filing Date Sep. 20, 2013, and which claims the benefit of the South African Patent Application Nos. 2012/07105, filed Sep. 21, 2012, 2012/08256, filed Nov. 2, 2012, 2012/08932, filed Nov. 27, 2012, 2012/09320, filed Dec. 10, 2012 and 2012/09668, filed Dec. 20, 2012, the disclosures of all applications being incorporated herein by reference.

BACKGROUND

The international retail industry, particularly in respect of fast moving consumer goods ("FMCG"), consumer packaged goods ("CPG"), durable and major appliances, has experienced significant growth in recent years. Large manufacturers ship to and sell their products in a number of countries around the world. As with all things however, there are various challenges facing the retail industry, which include, effective marketing and promotion of products; determining the effectiveness of implemented marketing and promotion strategies; protecting brand authenticity from knock-off, counterfeit or imitation products; protecting products tampering and/or identifying products whose integrity may have been compromised, and the like.

For example, product manufactures and/or retailers may promote products by incentivizing the purchase of the products by offering discounts, buy-one-get-one-free offers, other specials, as well as employing other incentive based strategies. For instance, a manufacturer may instruct a retailer to discount a particular product for a predetermined period of time. In doing so, the manufacturer may be hoping to win new consumers over from competing products. Alternatively, a product may be offered free of charge with the purchase of an associated product. Such a promotion also tends to run for a predetermined period of time or while stocks last.

However, it may be difficult or even impossible to determine if new consumers were in fact persuaded into buying the relevant products by the promotions or whether they would have purchased the product irrespective of the reduced price. This implies that the retailer may have incurred an unnecessary loss by giving existing loyal consumers discounts when they would have purchased the product at the original price in any event.

Furthermore, manufactures or retailers may have no way of knowing what lead the consumer to purchase the product. In addition, manufactures or retailers do not have easy access to consumers' opinions of a product after it has been purchased, nor do they know the light in which their product is shown to the user's contacts or is recommended to such contacts, if at all. While there are often prompts or request for consumers to rate a product, or even to recommend the product to a contact, the incentive to the recommender to do so remains weak. As a result, consumers may be less inclined to take the time to rate or recommend a product. In addition, in most cases where products are in fact recommended by consumers to their other contacts, there is typically no way for manufacturers and/or retailers of knowing that the product was so recommended or, in fact of identifying when a consumer acts on a recommendation.

These marketing and incentive strategies are of course of no use if products which reach consumers have been tampered with or are otherwise contaminated. For example, fast moving consumer, or consumer packaged goods are often packaged and transported in disposable containers which are prone to tampering, thereby permitting the products contained therein to be contaminated or altered without the knowledge of the consumer. Attempts to curb tampering include various forms of tamper proof, tamper evident or security seals and although such seals are typically easy to use and provide a good means of indicating any tampering with a container, such seals can be easily overcome, the product contaminated and the seal replaced without the consumer's knowledge. Furthermore, such security seals are normally only capable of indicating whether a container has been opened while the status or integrity of the product remains unknown to a consumer.

Similarly, due to the successes of certain products internationally, counterfeit or imitation products, more commonly referred to as "knock-off" products, are manufactured worldwide by unscrupulous operators and are sold in markets where they compete with the originator products. Manufacturers are therefore struggling to protect the authenticity of their branded products from these knock-off products. Similarly, consumers are often not able to confirm the authenticity of products as they are often intended, by means of imitation packaging and even actual product appearances, to deceive the consumer into believing they originate from the original manufacturer.

The applicant is aware of radio frequency identification ("RFID") tags that have been used with some success in the industry to attempt to alleviate the abovementioned problem. RFID tags may be secured to products, often in obscured positions, and can be wirelessly read by RFID and, more recently, near field communication ("NFC") readers. Once so read, RFID tags convey static information stored on them to the interrogating devices. To do so RFID tags typically include a non-volatile memory module storing identification information about the product. An electronic product code ("EPC") is one common type of data stored in an RFID tag.

A problem with RFID tags is, however, that the information that they contain and that they convey to readers is of a static nature. In other words, a tag will convey the same information to any authorized reader or interrogation device on any number of successive interrogations. The static nature of the information conveyed during interrogation makes RFID tags vulnerable to unauthorized replication, thereby negating their intended function.

BRIEF SUMMARY

According to a first aspect of the present invention there is provided a dynamic object tag for a product, comprising: a hardware security module including an electronic storage module; and a communication module for communicating with an interrogation device; the hardware security module being adapted to establish a secure communication channel with the interrogation device, to exchange dynamic authentication parameters with the interrogation device, and to communicate product information stored on the electronic storage module to the interrogation device over the secure communication channel.

A further feature of the invention provides for the communication module to be a radio-frequency communication module.

Further features of the invention provide for the tag to include a power harvesting component for powering the hardware security module and the communications module from the interrogation device. The power harvesting component may be operable to wirelessly harvest power from signals emanating from the interrogation device; and for the power harvesting component to be a near field communication (NFC) or radio frequency identification (RFID) coil configured to harvest power from an active NFC or RFID reader acting as the interrogation device which is brought in close proximity to it. The communication module and power harvesting component may both be implemented by means of the NFC or RFID coil.

The hardware security module may communicate the product information stored on the electronic storage module to the interrogation device for forwarding the product information to a remotely accessible server, wherein the product information includes a unique product identifier.

At lease some of the product information or other data stored on the electronic storage module may be in-field rewritable. In-field rewritable product information or data may include the product information or data being updated, added-to or programmable during the use of the dynamic object tag in association with the product during the lifetime of the product.

In one embodiment, exchanging dynamic authentication parameters includes the hardware security module establishing a handshake with the interrogation device to exchange variable encryption keys and unique identifiers, wherein each response by the dynamic object tag to an interrogation is dynamic and unique.

In another embodiment, exchanging dynamic authentication parameters includes the hardware security module exchanging a sequential counter and one or more authentication codes. The set of authentication codes may be at least partially recalculated by the interrogation device upon each successful interrogation of the dynamic object tag, the recalculated authentication codes being communicated back to the hardware security module over the secure communication channel for storage in the electronic storage module and use during a subsequent interrogation.

Further features of the invention provide for the hardware security module to be configured to provide a dynamic response which is unique to the interrogation device each time it is interrogated; and for the sequential counter to indicate the number of times the tag has been interrogated.

Preferably, the interrogation device may include a hardware security module configured to establish the secure communication channel with the hardware security module of the dynamic object tag.

A further feature of the invention provides for the dynamic object tag to be configured to be secured to a product, product packaging or a display shelf on which the product is displayed.

The product information may include one or more of the group of: a unique product identifier; product attributes written to the electronic storage module at the time of manufacture; product attributes updated by an authorized interrogation device; product attributes updated by events experienced by the product.

Further features of the invention provide for at least some of the product information stored in the electronic storage module to be rewritable by the authorized interrogation device, such that the rewritable product information may be updated by the authorized interrogation device during a lifetime of the product.

Further features of the invention provides for the hardware security module to be configured to resist intrusion; for the hardware security module to conform to FIPS 140-2 level 2 or above; for the hardware security module to transmit a dynamic response to each successful interrogation, the dynamic response being unique for each interrogation; and for the interrogation device to include a hardware security module configured to establish the secure communication channel with the hardware security module of the dynamic object tag.

Yet further features of the invention provide for the hardware security module to transmit encrypted product information including an electronic product code to the interrogation device which forwards the encrypted product information to a remotely accessible server for decryption and authentication of the product and possible further processing. In a different embodiment of the invention, the communication module transmits the encrypted product information directly to the remotely accessible server for decryption and authentication. In a still further embodiment of the invention the product information may be displayed on the interrogation device.

The dynamic object tag may include one or more sensors for sensing events experienced by the product. The dynamic object tag may further include one or more actuators for activating a response to events experienced by the product.

Further features of the invention provide for the dynamic object tag to be disposed in a tamper evidencing closure for a product container, the tamper evidencing closure comprising a body configured to be secured over and seal an opening of the container, the dynamic object tag including at least one sensor being in electrical communication with the dynamic object tag and operable to detect an event intimating a compromise of the integrity of the product and to communicate the detection of the event to the dynamic object tag, the dynamic object tag in turn being operable to store the detection of the event and to communicate it to an interrogation device upon interrogation of the dynamic object tag by the interrogation device.

Still further features of the invention provide for the dynamic object tag to include one or more actuators for interacting with its environment; for the sensors to be one or more of temperature, movement, atmospheric, reed, smoke, GPS, timing, pressure, sound, moisture, proximity, light, IR, current, voltage, mass, and volume sensors; for the actuators to be one or more of a relay or switch, circuit breaker, speaker, motor, light and electronic display unit; for the communication module to include a Wi-Fi, IR, RF, NFC, RFID, Bluetooth, GSM/CDMA or Ethernet interface; and for the dynamic object tag to further include a power storage unit.

In one embodiment of the invention, the dynamic object tag is secured to a storage medium for storing digital data, the dynamic object tag being configured to communicate with at least one paired interrogation device, and to provide read access to the interrogation device such that the digital data is communicated to the interrogation device.

Further features of the invention provide for the data to be stored on the storage medium in an encrypted format, the dynamic object tag being operable to decrypt the stored data and forward the decrypted data to the communication module for onward transmission to the interrogation device over the secure communication channel; alternatively for the dynamic object tag to be operable to forward the encrypted data to the interrogation device over the secure communication channel for decryption and interpretation by the interrogation device.

Further features of the invention provide for the data storage device to be an optical disk including a compact disk (CD), digital video disk (DVD), Blu-ray disk (BD) or any other optical disc suitable for data storage, for the interrogation device to be a near field communication (NFC) enabled mobile device, such as an RFID tag or NFC enabled mobile phone, or an optical or magnetic disk reader configured with a hardware security module.

Further features of the invention provide for the data storage device to include one or more electrophoretic ink (E-Ink) regions for selectively exposing and obscuring selected regions of the storage medium on instruction from the interrogation device. The E-Ink regions may be transparent when exposing the selected regions and opaque when obscuring them. The dynamic object tag may be operable to expose one or more of the selected regions when paired with the hardware security module of the interrogation device and obscure the selected regions when not so paired.

According to a second aspect of the present invention there is provided a system comprising at least one dynamic object tag, and an interrogation device wherein: the dynamic object tag is associated with a product and includes: a hardware security module including an electronic storage module; and a communication module for communicating with the interrogation device, the hardware security module being adapted to establish a secure communication channel with the interrogation device, to exchange dynamic authentication parameters with the interrogation device, and to communicate product information stored on the electronic storage module to the interrogation device over the secure communication channel; and the interrogation device has a unique digital user identifier associated with it and is operable to interrogate the dynamic object tag, to obtain product information including at least a product identifier from the dynamic object tag during the interrogation.

Further features of the invention may provide for at least some of the product information or other data stored in the electronic storage module being in-field rewritable. The rewritable product information may be updated by the authorized interrogation device or by events in the product environment during a lifetime of the product.

The system may further include: a remotely accessible server in communication with the interrogation device, wherein the remotely accessible server has a database in which product information is stored in association with a unique product identifier, the remotely accessible server being configured to receive a product identifier from the interrogation device, having been obtained from a dynamic object tag of a product by the interrogation device.

In one embodiment, product rules may be stored in association with the product information at the remotely accessible server.

A plurality of user profiles may be stored in the database, the remotely accessible server being configured to receive a user identifier corresponding to the interrogation device from the interrogation device, retrieve a user profile from the database corresponding to the user identifier and store the product information in association with the user profile.

Further features of the invention provide for a plurality of user profiles being stored in the database, the remotely accessible server being configured to receive a product identifier, having been obtained from a dynamic object tag of a product by an interrogation device, and a user identifier corresponding to the interrogation device from the interrogation device, retrieve a user profile from the database corresponding to the user identifier and store the product information in association with the user profile.

The user profile may include one or more of: information on consumer spend history, consumer purchase history, consumer spend frequency, and consumer economic value.

Further features of the invention provide for the remotely accessible server to be further configured to determine, based at least on the product identifier, the user profile and a predetermined incentive strategy, an incentive which should be provided to a user of the interrogation device to incentivize the purchasing of the product or associated products; and, to communicate the incentive to the interrogation device via a communication network for display to the user.

Still further features of the invention provide for the incentive to include a discount on the purchase price of the product, or a discount on one or more associated products; for the consumer profile to include one or more of information on consumer spend history, consumer purchase history, consumer spend frequency, and consumer economic value; and for the communication network to be a localized Wi-Fi network associated with the retailer or mobile communications network.

Further features of the invention provide for the interrogation device to be configured to transmit a recommendation in respect of a product to one or more other interrogation devices, the recommendation including at least the product identifier, having been obtained from a dynamic object tag of the product by the recommending interrogation device, and a user identifier corresponding to the recommending interrogation device. Similarly for the interrogation device to be configured to receive a recommendation in respect of a product from one or more recommending interrogation devices, store the recommendation in a recommendation list, detect when a stored recommendation is acted upon and, upon such detection, communicate an action notification to a remotely accessible server, the action notification including at least the product and user identifiers. The remotely accessible server being further configured to receive the action notification from a recommendee interrogation device, to identify the recommending interrogation device and recommended product from the user identifier and product identifier included in the action notification, and provide an incentive to a user of the recommending interrogation device for recommending the product.

Yet further features of the invention provide for the dynamic object tag to contain product and/or product packaging information, for the information to include any one or a combination of the time or date on which the product was packaged, a location at which the product was packaged, the manufacturing date, ingredients, allergens, expiration date, best before date, or electronic product code; and for the information to be transmitted to the interrogating device together with the product identifier.

A further feature provides for the recommendation to be communicated directly to the recommendee interrogation device from the recommending communication device over the communication network; alternatively for the recommendation to be communicated to the recommendee interrogation device from the recommending interrogation device over a communication network via the remotely accessible server, the remotely accessible server being configured to receive the recommendation from the recommending interrogation device and to store in association with a user profile corresponding to either or both of the recommending and recommendee interrogation devices, to relay the recommendation to the recommendee interrogation device, to detect when a user of the recommendee interrogation device acts upon the recommendation, and to provide an incentive to the user upon such detection.

According to a third aspect of the present invention there is provided a method for identifying a product, the method being conducted at an interrogation device having a unique digital user identifier, and comprising the steps of: establishing a secure communication channel with a dynamic object tag, the dynamic object tag being associated with the product; exchanging dynamic authentication parameters with the dynamic object tag; and, requesting product information including at least a product identifier from the dynamic object tag; and, receiving the requested product information over the secure communication channel.

The method may include a further step of displaying the requested product information on a display screen of the interrogation device.

The method may include a further step of communicating the received product information and user identifier to a remotely accessible server.

Further features of the invention provide for the method to include a further step of receiving, from the remotely accessible server, an incentive to be offered to the user to incentivize the purchase of the product and/or one or more associated products, the incentive having been calculated based at least on the product identifier, a user profile, and a predetermined incentive strategy.

Further features of the invention provide for the method to include a further step of transmitting a recommendation in respect of the product to one or more other interrogation devices, the recommendation including at least the product identifier, having been obtained from the dynamic object tag of the product by the recommending interrogation device, and a user identifier corresponding to the recommending interrogation device.

The method may include further steps of receiving a recommendation in respect of the product from one or more recommending interrogation devices, storing the recommendation in a recommendation list, detecting when a stored recommendation is acted upon and, upon such detection, communicating an action notification to a remotely accessible server, the action notification including at least the product and user identifiers.

According to a fourth aspect of the present invention there is provided a method conducted at a dynamic object tag associated with a product, the method comprising the steps of: establishing a secure communication channel with an interrogation device; exchanging dynamic authentication parameters with the interrogation device; and, communicating product information stored on an electronic storage module of the dynamic object tag to the interrogation device over the secure communication channel.

Further features of the invention provide for the method to include a further step of receiving updated product information from an authorized interrogation device.

According to a fifth aspect of the present invention there is provided a computer program product for identifying a product, the computer program product stored on a non-transitory computer-readable medium and executable by a processing circuit to perform the steps of: establishing a secure communication channel with a dynamic object tag, the dynamic object tag being associated with the product; exchanging dynamic authentication parameters with the dynamic object tag; and requesting product information including at least a product identifier from the dynamic object tag; and, receiving the requested product information over the secure communication channel.

According to a sixth aspect of the present invention there is provided a method conducted at a remotely accessible server having a database in which a plurality of user profiles is stored, the method comprising the steps of: receiving product information including a product identifier and a user identifier from an interrogation device associated with a user, the product identifier having been obtained from a dynamic object tag of a product by the interrogation device; retrieving a user profile from the database corresponding to the user identifier; and, storing the product information in association with the user profile.

Further features of the invention provide for the method to further include the steps of: calculating, based at least on the product identifier, the user profile, and a predetermined incentive strategy, an incentive to be offered to the user to incentivize the purchase of the product and/or one or more associated products; and, communicating the incentive to the interrogation device for display to the user.

Further features of the invention provide for the step of calculating the incentive to include basing the calculations on one or more of the group of: a marketing strategy; a retailer's or manufacturer's analytics, and a consumer economic value; and calculating a discount on a purchase price of the product, or a discount on one or more associated products.

Still further features of the invention provide for the step of retrieving a user profile from the database corresponding to the user identifier to include retrieving information on one or more of user spend history, user purchase history, user spend frequency, and user economic value; and for the steps of receiving the product and user identifiers and communicating the incentive to the interrogation device. The method may include transmitting the information over a localized Wi-Fi network or mobile communication network.

Further features of the invention provide for the method to further include the steps of: receiving an action notification from a recommendee interrogation device, the action notification including an indication that a user of the recommendee interrogation device has acted upon a product recommendation, the product recommendation having been received by the recommendee interrogation device from a recommending interrogation device; identifying the recommending interrogation device and a product from user and product identifiers included in the action notification; and providing an incentive to a user of the recommending interrogation device for recommending the product.

BRIEF DESCRIPTION OF THE DRAWINGS

FIG. 19 is a flow diagram which illustrates a method for identifying a product according to an embodiment of the invention;

FIG. 20 is a block diagram which illustrates a method which is conducted at a dynamic object tag according to an embodiment of the invention;

DETAILED DESCRIPTION

Embodiments of the invention are directed at a dynamic object tag to be associated with a product, for example by being attached to a product and/or product packaging. This may be in a brick and mortar retail environment, for products in transit to a destination, or other environments. The dynamic object tag may be configured to store product information relating to the product to which it is attached, and to communicate the product information to an interrogation device upon interrogation by such an interrogation device.

Figure 1:
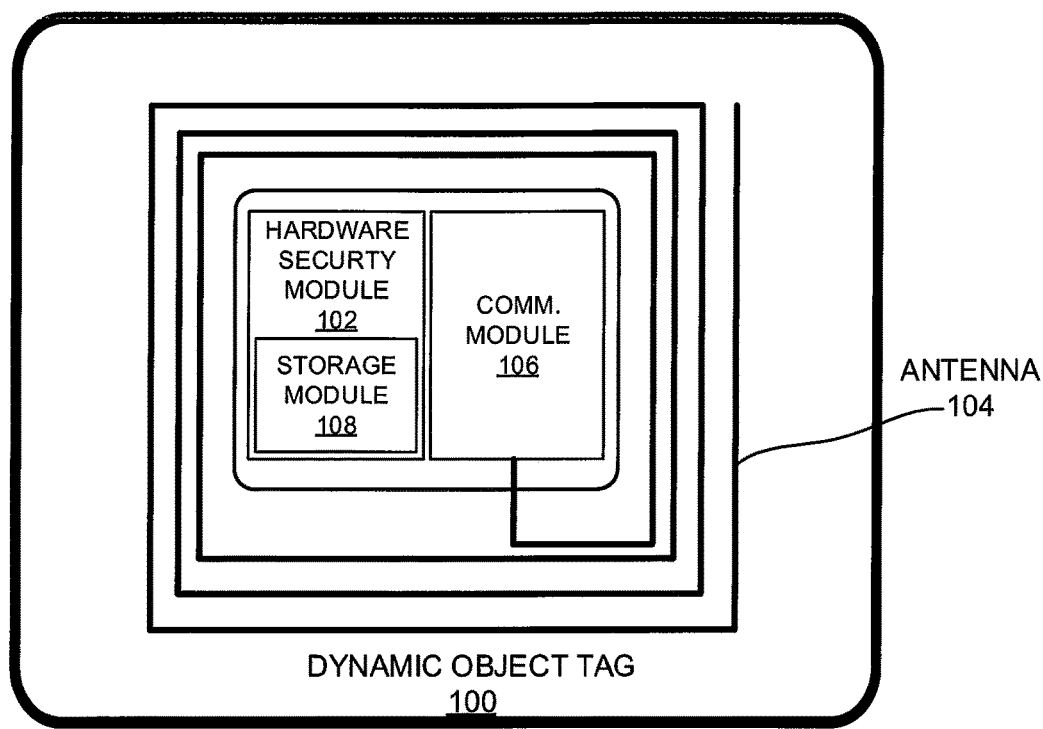
FIG. 1 is a block diagram of an exemplary dynamic object tag according to a first embodiment of the invention.

A block diagram of an exemplary dynamic object tag according to a first embodiment of the invention is illustrated in FIG. 1. The dynamic object tag (100) includes a hardware security module (HSM) (102) further details of which are given below. The hardware security module (102) may include an electronic storage module (108) capable of storing information relating to a product to which the dynamic object tag (100) is attached or relates.

The dynamic object tag (100) may also include a communication module (106) for communication with an interrogation device. The communication module (106) may include an antenna (104) or other form of transmitter/receiver for wireless communication. For example the communication module (106) and antenna (104) may be configured to enable radio-frequency or microwave communication. In some embodiments, the communication module (106) may be provided with an appropriate transmitter/receiver and configured to enable any one of more of the group of: radio-frequency communication; microwave communication; near sound communication being either sonic or ultrasonic; visible light communication; infrared communication; and electromagnetic induction communication.

The communication module (106) may enable wireless, non-contact, communication using, for example radio-frequency communication or any other appropriate wireless communication, to transfer data. For example, the communication module (106) may be a known form of tag such as a RFID or NFC tag. Alternatively, the communication module (106) may use communication aspects of a known form of tag in cooperation with other aspects provided by the hardware security module (102), for example, a storage module, a processor, a communication interface, etc.

In a further embodiment, the communication module (106) may be incorporated into the hardware security module (102).

In one embodiment, the antenna (104) may be a passive NFC or RFID coil. The antenna (104) may be coupled to and in electrical communication with the communication module (106) and may be capable of harvesting power from an active interrogation device (in this embodiment being an NFC or RFID enabled interrogation device).

In another embodiment, the dynamic object tag (100) may be an active device with an on-board power supply such as a battery.

The communication module (106) is coupled to and in electrical communication with the hardware security module (102). The dynamic object tag (100) is accordingly operable to communicate with an interrogation device via the communication module (106) and the antenna (104).

The electronic storage module (108) may be incorporated into the hardware security module (102) or in close proximity thereto on the dynamic object tag (100), on which is stored product related information of a product to which the dynamic object tag (100) is intended to be associated.

This information may include an electronic product code (EPC), or other form of unique identifier of the product, assigned to the product by a remotely accessible server, such as a central product server, and which may be written to the storage module (108) at the time of manufacture, or thereafter, by an authorized device, before associating the dynamic object tag (102) with the product.

Other product information which may be stored in the electronic storage module (108) may include any one or more, where applicable, of the group of product attributes: a product expiry date; best before date or sell by date; product ingredients; product allergens; product version; a product manufacture date; a product batch number; a stockkeeping unit; a serial number; a shelf life of the product; nutritional information of the product; and the like.

The EPC and/or other product related information may be written to and stored on the storage module (108) of the hardware security module (102) at the time of manufacture. In this case the hardware security module (102) may be configured so as not to allow any third party devices to change or write additional information to the storage module (108) once it has been programmed.

In an alternative embodiment, interrogation devices being dedicated product management devices may be provided with authorization codes that enable them to change, update or append the product information stored on the dynamic object tag storage module (108) in the field, for example, as and where the products are displayed on store shelves. It should be noted that such authorized devices may be provided with unique encryption codes that would facilitate communication with only a specified selection of dynamic object tags (102), which in turn may be pre-programmed with complementary encryption keys at the time of manufacture. In this way a product management device intended for use in a specific store may not, for example, be able to operate on dynamic object tags (102) used in other stores.

In a further embodiment, the product information stored in the electronic storage module (108) may be updated during the lifetime of the product to which the dynamic object tag (102) is associated. The product information may be updated by events sensed or actuated at the product. The product information may be dynamically updated to include one or more of the group of: updates to product attributes; events relating to the treatment or environment of the product; product integrity; etc. In some embodiments, at least some of the product information stored in the electronic storage module is rewritable by an authorized interrogation device, such that the rewritable product information may be updated by the authorized interrogation device during a lifetime of the product. For example, a product price, special offer, remaining shelf life or the like may be updated by an authorized interrogation device whilst the product is on sale in a retail environment.

It should be noted that a dynamic object tag equipped with a hardware security module according to the invention is different from devices that solely use software to encrypt data. A device that solely uses software to encrypt communications may comply with only a security level 1 of the Federal Information Processing Standard 140-2 (FIPS 140-2), which provides only a minimum level of security to protect sensitive information. In contrast, the hardware security module within a dynamic object tag according to embodiments of the invention is compliant with at least a security level 2 of the FIPS 140-2 standard. Preferably, the hardware security module within a dynamic object tag in embodiments of the invention is compliant with security level 3 or level 4 of FIPS 140-2.

The hardware security module uses hardware to encrypt data instead of solely performing the encryption in software and accordingly provides enhanced protection over software encryption technologies. For example, the hardware security module provides secure key management to generate cryptographic keys, sets the capabilities and security limits of keys, implements key backup and recovery, prepares keys for storage and performs key revocation and destruction. In some embodiments, the hardware security module is implemented as a dual processor device that includes a secure processor with storage and a public processor with storage. The hardware security module may also include a physical or logical separation between interfaces that are used to communicate critical security parameters and other interfaces that are used to communicate other data. The hardware security module can also provide a tamper-proof mechanism that provides a high risk of destroying the hardware security module and the cryptographic keys stored therein, if any attempt is made to remove or externally access the hardware security module.

Figure 2:
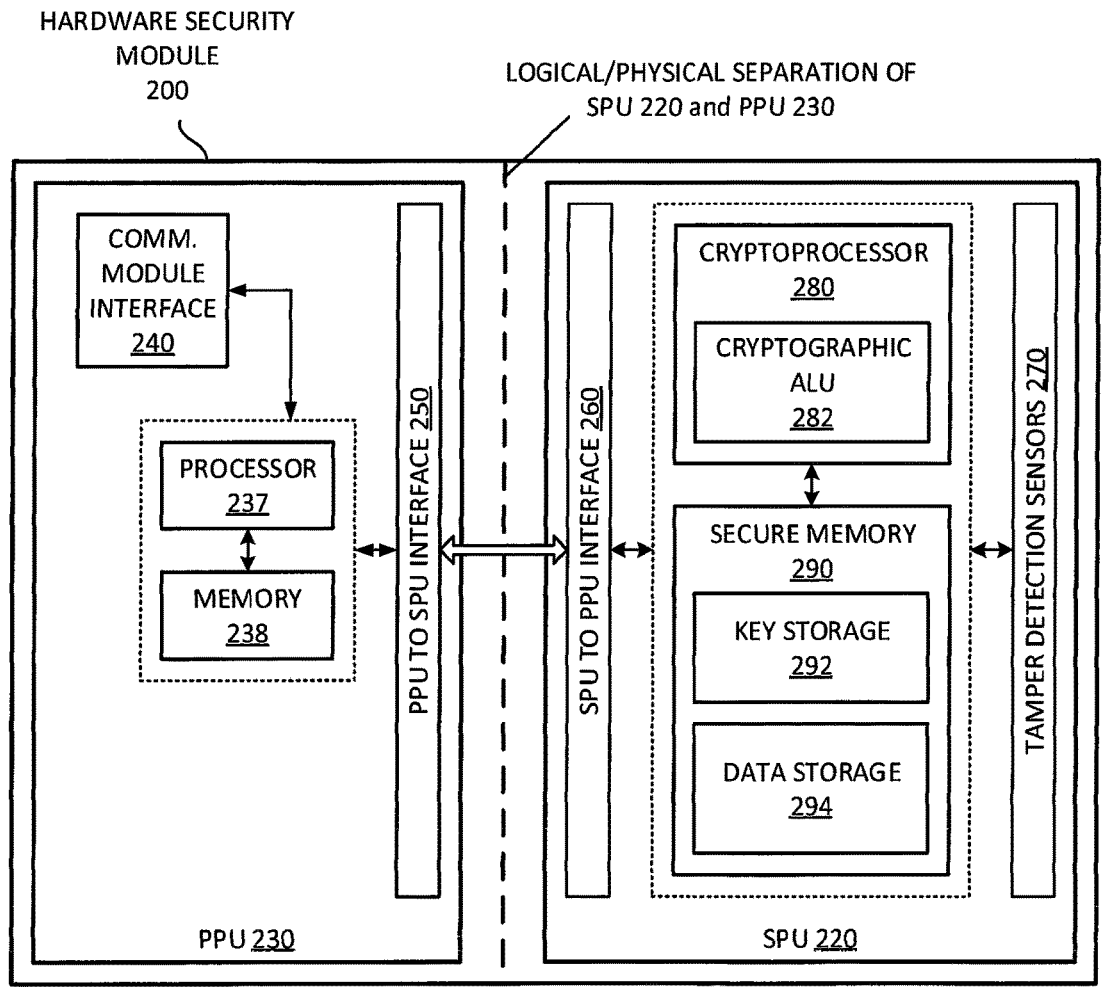
FIG. 2 is a block diagram illustrating hardware components of a the hardware security module according to embodiments of the invention.

FIG. 2 shows a block diagram illustrating the hardware components of a the hardware security module (200), such as that of the dynamic object tag (100) described above with reference to FIG. 1, according to one embodiment. The hardware security module (200) may include a public processing unit (PPU) (230), and a secure processing unit (SPU) (220) coupled to the PPU (230). It should be noted that although the SPU (220) is coupled to the PPU (230), the hardware security module (200) provides a logical and/or physical separation between the SPU (220) and the PPU (230). A "physical separation" refers to some physical boundary between the SPU (220) and the PPU (230). For example, the SPU (220) and the PPU (230) may be implemented with and manufactured as separate semiconductor dies or separately packaged semiconductor chips, and the physical boundary of the dies or chips can serve as the physical separation. A "logical separation" refers to the separation of the communication interface and storage memory between the SPU (220) and the PPU (230). As shown in FIG. 2, the SPU (220) may have its own communication interfaces (240 and 250), which are separate from the communication interface (260) of the SPU (220). The PPU (230) may also have its own memory (238), which is separate from the secure memory (290) of the SPU (220). As will be explained below, the logical and/or physical separation provided between the SPU (220) and the PPU (230) creates a division in hardware roles to protect the SPU (220) and the contents stored in the secure memory (290) from unauthorized accesses.

The electronic storage module (108) of the hardware security module (102) described in FIG. 1 may be provided by the data storage (294) of the secure memory (290).

According to some embodiments, the PPU (230) includes a processor (237), the memory (238), a communication module interface (240), and a PPU-to-SPU interface (250). The processor (237) may be implemented as one or more processors or controllers. The memory (238) may be coupled to the processor (237), and provides storage to store data and executable code that when executed by the processor (237), causes the processor (237) to run an operating system (OS) and/or applications to manage the functionality and operations of the hardware security module (200), and to process the exchange of information between the various interfaces of the PPU (230).

The communication module interface (240) may be coupled to a communication module of the dynamic object tag, and provides a set of signals that can include a clock signal and one or more data input/output (I/O) signals to send and receive commands and information between the PPU (230) and the communication module. The PPU-to-SPU interface (250) may be coupled to the SPU (220), and provides a set of signals that can include a clock signal and one or more data input/output (I/O) signals to send commands and information such as encryption and decryption requests and/or product information requests to the SPU (220), and to receive commands and information such as encryption and decryption results and/or product information from the SPU (220). Because of the logical and physical separation between the SPU (220) and the PPU (230), the SPU (220) is exposed to the PPU (230) only, and is not accessible to the communication module, except through the PPU (230). Hence, the PPU (230) can serve as a firewall or a gatekeeper to ensure unauthorized or unwanted communications such as hacking attempts are not sent to the SPU (220).

According to some embodiments, the SPU (220) includes a cryptoprocessor (280), the secure memory (290), and an SPU-to-PPU interface (260). The SPU (220) may also include tamper detection sensors (270). As mentioned above, the SPU (220) is accessible from the PPU (230) only, and receives commands and information from the PPU (230) through the SPU-to-PPU interface (260). The SPU-to-PPU interface (260) provides a set of signals that can include a clock signal and one or more data input/output (I/O) signals coupled to the PPU-to-SPU interface (250) so that the SPU (220) can use to communicate with the PPU (230). In some embodiments, the SPU (220) will only respond to encryption and decryption requests to perform cryptographic operations and/or product information requests from the PPU (230) received through SPU-to-PPU interface (260).

The cryptoprocessor (280) may be implemented as one or more cryptographic processors. A cryptographic processor is different from a general purpose processor in that a cryptographic processor includes dedicated circuitry and hardware such as one or more cryptographic arithmetic logic units (ALU) (282) that are optimized to perform computational intensive cryptographic functions. The cryptographic ALU (282) may include optimized pipelines and widen data buses to enable the cryptoprocessor (280) to perform cryptographic operations faster and more efficiently than general purpose processors.

The secure memory (290) may be coupled to the cryptoprocessor (280), and can be partitioned into a cryptographic key storage (292) and a data storage (294). The data storage (294) may be read and written by the cryptoprocessor (280), and provides storage memory to store product information and other data such as data that are received on the SPU-to-PPU interface (260) from the PPU (230), and encryption and decryption results that are sent to the PPU (230) through the SPU-to-PPU interface (260). The cryptographic key storage (292) can be read-only to the cryptoprocessor (280), and is used to store cryptographic keys and encryption algorithms. The cryptographic keys and algorithms stored in the cryptographic key storage (292) are provisioned by the manufacturer during manufacturing of the hardware security module (200), and cannot be altered by an external source without a master key that is only known to the manufacturer and/or authorized parties who are authorized to provision the hardware security module (200). In some embodiments, the contents of the cryptographic key storage (292) are never transmitted outside of the SPU (220), and are inaccessible by the PPU (230). The cryptographic keys and algorithms stored in the cryptographic key storage (292) can be provisioned to perform various encryption standards and protocols including but not limited to Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

In some embodiments, the SPU (220) may also include tamper detection sensors (270) to detect external attempts to tamper with the hardware security module (200). For example, the tamper detection sensors (270) may include temperature sensors to detect temperatures that may be indicative of someone attempting to desolder components of the hardware security module (200), and/or mechanical sensors to sense structural changes to the hardware security module (200) that may be indicative of someone attempting to dissect or cut open the hardware security module (200). The tamper detection sensors (270) may also include electrical sensors to sense certain voltage, current, or impedance changes to the circuitry of the hardware security module (200) that may be indicative of someone attempting to probe the components of the hardware security module (200), and/or electromagnetic sensors to sense certain radiation such as X-rays that may be indicative of someone attempting to examine the hardware security module (200). In some embodiments, the tamper detection sensors (270) may include circuitry that can erase and wipe out the contents of the secure memory (290) to render the SPU (220) and/or the hardware security module (200) unusable in response to detecting an attempt to tamper with the hardware security module (200). The hardware security module (200) can also be configured with organic or soluble interconnects that can be dissolved by a solvent released by the tamper detection sensors (270) in response to detecting an attempt to tamper with the hardware security module (200).

Figure 3:
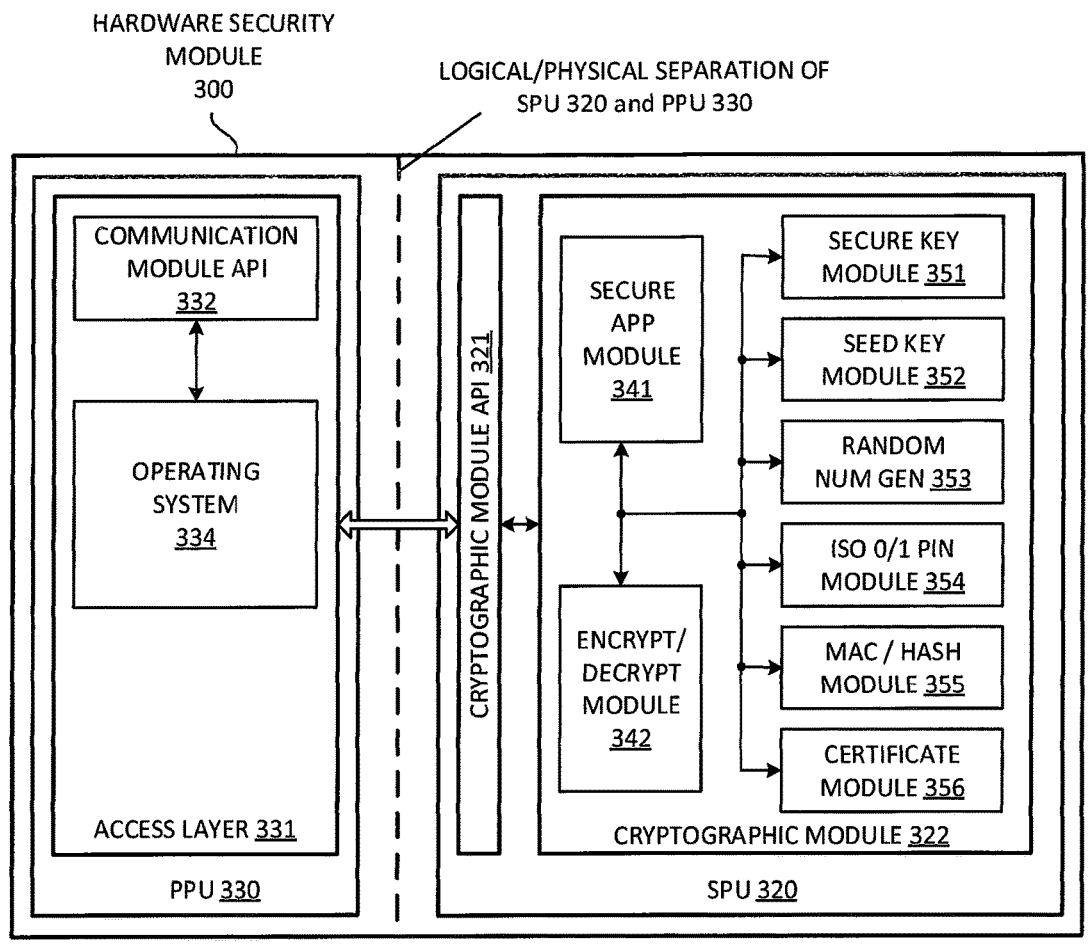
FIG. 3 is a conceptual block diagram illustrating the functional features of a hardware security module according to embodiments of the invention.

FIG. 3 shows a conceptual block diagram illustrating the functional features of a hardware security module (300), such as a hardware security module described above with reference to FIGS. 1 and 2, according to one embodiment. The hardware security module (300) may be implemented with, for example, the hardware components described with reference to the hardware security module (200) of FIG. 2. A PPU (330) of the hardware security module (300) may include an operating system (OS) (334) and a communication module application programming interface (API) (332). The OS (334) and communication module API (332) together may form an access layer (331), which represents the publicly accessible portion of the hardware security module (300). By "publicly accessible," it is meant that, for example, a communication module of a dynamic object tag would be able to send and receive commands and information to and from the access layer (231).

The communication module API (332) may provide a programming interface to translate commands and information received from a communication module into instructions and data that the OS (334) can process and execute, and vice versa. For example, the communication module API (332) may translate commands from the communication module and data that the OS (334) can process and execute to respond to the commands, and vice versa.

The OS (334) may manage the functionality and operations of the hardware security module (300), and responds to commands and information from the communication module. The functionality and operations of the hardware security module (300) that the OS (334) may manage include: responding to product information requests received from an interrogation device via a dynamic object tag to which the hardware security module is coupled; sending encryption and decryption requests to the SPU (320) for secure communications sent to and from the communication module; sending requests to the SPU (320) to create or verify MAC or hash values for messages or portions of messages sent to and from the communication module; providing certificates for HTTPS applications; storing encrypted communications history; providing basic encryption to external applications; and managing commands and information exchange through the various interfaces.

For example, in response to encryption and decryption commands received from the communication module on the communication module API (332), the OS (334) may send encryption and decryption requests and associated data to the SPU (320). The OS (334) may forward encryption and decryption results and/or product information from the SPU (320) to the communication module. The OS (334) may also issue commands to the communication module, for example, commands to request the communication module to send a secure communication with data encrypted by the SPU (320).

The SPU (320) of the hardware security module (300) may include a cryptographic module API (321) and a cryptographic module (322). The cryptographic module API (321) provides a programming interface to translate commands and information received from the OS (334) into instructions and data that the cryptographic module (322) can process and execute, and vice versa. For example, the OS (334) may send a product information request to the SPU (320), and the cryptographic module API (321) may translate the product information request into a product information instruction for the cryptographic module (322) to execute. In some embodiments, the cryptographic module API (321) may also include, in the translated product information instruction, that the product information be encrypted, and which particular encryption algorithm the cryptographic module (322) should use based on the particular application that is requesting the cryptographic operation.

According to various embodiments, the cryptographic module (322) may include: a secure application module (341), an encryption/decryption module (342), a secure key module (351), a seed key module (352), a random number generator (353), an ISO 0/1 PIN module (354), a MAC/HASH module (355), and a certificate module (356). In other embodiments, the cryptographic module (322) may include additional modules to perform other cryptographic operations. The secure application module (341) can store one or more secure applications such as product information applications, product integrity applications, or product tampering applications. The secure application module (341) may process inputs selecting a particular function of the secure applications stored therein, and may respond with one or more commands instructing the communication module to perform certain operations, for example, to send an encrypted communication or send a sequence of messages to initiate communication with another device to carry out the user selected function. The secure application module (341) may also instruct the encryption/decryption module (342) to perform specific cryptographic operations depending on the selected function.

The encryption/decryption module (342) can store and execute various encryption algorithms such as Advance Encryption Standard (AES), Data Encryption Standard (DES), Triple Data Encryption Standard/Algorithm (TDES/TDEA), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other cryptographic or encryption algorithms. In response to encryption and decryption requests from the PPU (330) or from the secure application module (341), the encryption/decryption module (342) can look up the requested encryption algorithm, obtain any necessary keys from other modules in the cryptographic module (322), perform the encryption/decryption request, and respond with the encrypted/decrypted data.

The secure key module (351) may store the set of cryptographic or encryption keys that are used in the various encryption algorithms performed by the encryption/decryption module (342). The encryption keys may include symmetric keys and/or asymmetric keys. The seed key module (352) stores a set of seed keys that are used to initialize the encryption/decryption module (342) in certain encryption algorithms such as AES. The seed key module (352) also stores seed keys that are used by the random number generator (353) to generate random numbers used in certain encryption algorithms such as RSA and DSA. In some embodiments, the encryption keys stored in the secure key module (351) and/or the seed keys stored in the seed key module (352) are provisioned during manufacturing, and cannot be altered by an external source, for example, without a master key that was used during manufacturing to program the cryptographic module (322), or without authenticating the external source as an authorized source, etc. The encryption keys and seed keys may also be provisioned to be specific to a particular dynamic object tag, and hence the encryption keys and seed keys can, for example, be retailer or manufacturer-specific and unique to the retailer or manufacturer of the product to which the dynamic object tag is attached. One advantage of providing retailer or manufacturer-specific keys is to ensure that only interrogation devices authorized to interrogate the dynamic object tag may do so.

In some embodiments, the cryptographic module (322) includes an ISO PIN module (354) to mask a retailer or manufacturer's PIN entry into the dynamic object tag via the communication module and to generate PIN blocks (e.g., ISO format 0/1 PINs) in accordance with ISO 9564 standard. The PIN blocks generated by ISO PIN module 454 stores PINs in an encrypted format that are used to verify a manufacturer or retailer's identity in operations such as updating product information. The encrypted PINs stored in the PIN blocks of ISO PIN module (354) can be passed from the SPU (320) to the PPU (330) to be included in secure communications sent from the communication module. It should be noted that the PINs stored in ISO PIN module (354) are never stored in plaintext form, but are instead stored in an encryption format.

The cryptographic module (322) may also include a Message Authentication Code (MAC)/Hash module (355) to generate and verify MACs and/or hashes for secure communications sent to and from the communication module. A MAC or a hash can be generated for a message or a portion of the message such that the recipient can verify the message's data integrity and authenticity. The cryptographic module (322) can also include a certificate module to provide certificates such as Transport Layer Security (TLS) and Secure Sockets Layer (SSL) certificates used to verify a retailer or manufacturer's identity in Hypertext Transfer Protocol Secure (HTTPS) applications such as web applications accessed on a web browser of the communication module.

The incorporation of a hardware security module with the features as described above into a dynamic object tag according to embodiments of this invention may be suitable for high value products where the cost of manufacturing the dynamic object tag is minimal as compared to the product itself. For lower cost products, in further alternative embodiments of the invention, the dynamic object tag may include a hardware security module incorporated by means of fixed, printed electronics on a silicon microchip. Such a hardware security module may have the ability to store the EPC as well as a set of parameters and/or authentication codes that may change every time the dynamic object tag is successfully interrogated. In this way the dynamic object tag will be protected from replay attacks or spoofing. The set of parameters and/or authentication codes may also include a sequential counter which will be incremented each time the dynamic object tag is interrogated. In this way retailers, for example, may be able to determine the amount of interest in a particular product, which may in turn be used to provide more specific, targeted information to consumers. This information may, for example, include information to the consumer about related products that are typically purchased by other consumers interested in that product. In this way consumers may be encouraged or persuaded to purchase other items that they would not otherwise have purchased.

Instead of the dynamic object tag being able to perform all of the functionality of the dual processor hardware security module described in relation to FIG. 2 and FIG. 3, this functionality may be outsourced to the interrogation device or its hardware security module, thus leaving only storage and communication components to be handled by the dynamic object tag itself. It is, for example, envisaged that the dynamic object tag according to foregoing embodiments of the invention may allow for a set of parameters and/or authentication codes to be at least partially recalculated by the interrogation device, each time the dynamic object tag is successfully interrogated, and for the recalculated parameters or codes to be communicated back to the hardware security module of the dynamic object tag over the secure communication channel and stored in the storage module for use during a subsequent interrogation.

Once the dynamic object tag has been loaded with the relevant product information, the product information being stored in a storage module of the hardware security module, the dynamic object tag may be secured to a product, either on the product itself or the product packaging from where it may be read by an interrogation device. For this purpose it should be appreciated that the dynamic object tag may be configured with a suitable attachment means which could include, but is not limited to, an adhesive material on a surface thereof, or other mounting mechanism such as a clip, etc. In some embodiments, an attachment mechanism on the dynamic object tag itself may not be necessary. For example, the dynamic object tag can be embedded between the product container (i.e. a box or bottle, etc.) and a label wrapped around the product container. As another example, the dynamic object tag can be embedded under a container cap opening, or otherwise be inserted into the product container. The dynamic object tag may generally have a planar, square or rectangular shape, and may be small in size with its major dimensions in the millimeter ranges, preferably with its major dimension less than 10 mm. In other embodiments, the dynamic object tag may take on other shapes and may have other dimensions.

Figure 4A:
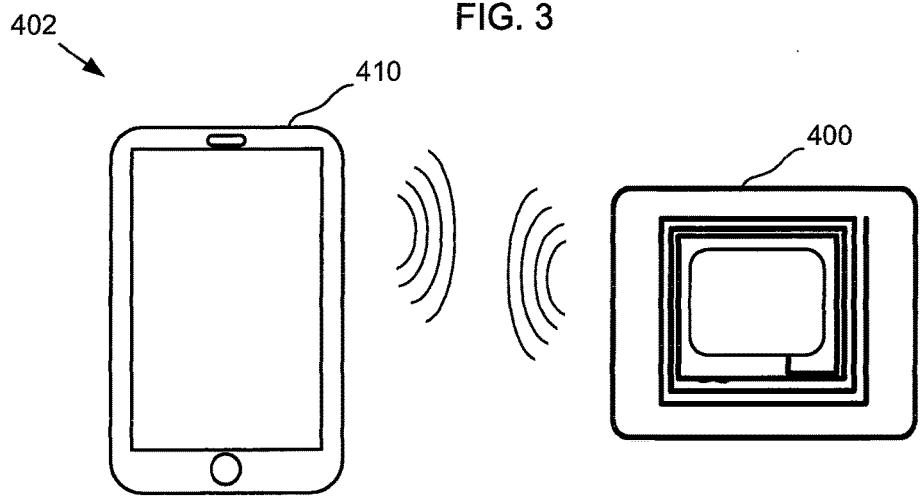
FIG. 4A is a block diagram which illustrates a dynamic object tag being interrogated by an interrogation device according to embodiments of the invention.

A dynamic object tag, having been secured to a product or product packaging and having product information stored therein, may then be interrogated by any appropriate, authorized interrogation device. FIG. 4A is a block diagram which illustrates a system (402) according to embodiments of the invention. The system includes a dynamic object tag (400) and an interrogation device (410). In one embodiment, the interrogation device (410) may be an NFC enabled mobile phone having its own hardware security module which enables end-to-end secure communications between the interrogation device (410) and the dynamic object tag (400).

The interrogation device (410) may be configured to energize an antenna of the dynamic object tag (400) and establish a secure communication channel with the dynamic object tag (400). The interrogation device may then exchange dynamic authentication parameters, which in some embodiments may include exchanging encryption keys/data, with the dynamic object tag (400) by means of which communication between the dynamic object tag (400) and the interrogation device (410) may be encrypted.

The dynamic object tag (400) may be configured to establish a secure communication channel with the interrogation device (410) and to exchange dynamic authentication parameters, for example exchange encryption keys/data, with the interrogation device (410) by means of which communication between the dynamic object tag (400) and the interrogation device (410) may be secured, for example by encryption. The dynamic object tag may be configured to authenticate the interrogation device to ensure that it is an authorized interrogation device, for example by ensuring that a key or encrypted data received from the interrogation device (410) is valid. The dynamic object tag (400) may be configured to receive a request for product information from the interrogation device (410) and responsive to receiving this request, to communicate the requested product information stored on a storage module of the dynamic object tag (400) to the interrogation device (410) in a secured format over the secure communication channel.

The interrogation device (410) may request product information including at least a product identifier from the dynamic object tag (400). In response to this request, the interrogation device (410) may be configured to receive the requested product information from the dynamic object tag (400). The interrogation device (410) may also be configured to communicate the received product information and user identifier to a remotely accessible server for association with a user profile stored within a database of the remotely accessible server.

Figure 4B:
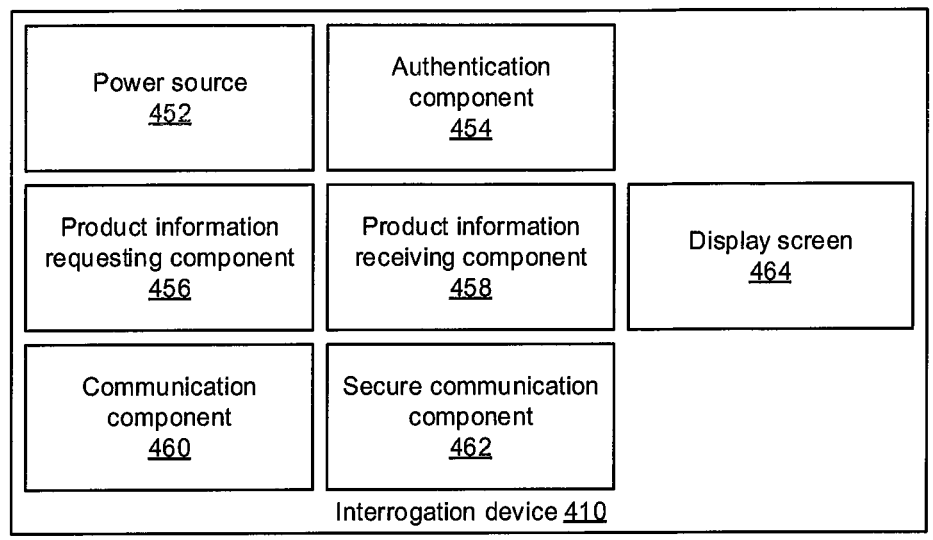
FIG. 4B is a block diagram which illustrates an exemplary interrogation device according to embodiments of the invention.

FIG. 4B is a block diagram which illustrates components of an exemplary interrogation device (410) according to embodiments of the invention. The interrogation device (410) has a power source (452) for energizing a dynamic object tag and an authentication component (454) for exchanging dynamic authentication parameters and/or encryption/decryption keys/data with a dynamic object tag. The interrogation device also includes a product information requesting component (456) and a product information receiving component (458). The interrogation device (410) may further include a communication component (460) for communicating with a remotely accessible server and/or other interrogation devices as well as a secure communication component (462) for communicating with a dynamic object tag. In some embodiments the secure communication component and the communication component may be the same, and a single component is configured to perform both the functions of the secure communication component and communication component. In some embodiments, the interrogation device may include a display screen (464) on which information may be displayed to a user. In other embodiments of the invention, the authentication component (454) and/or secure communication component (462) may be implemented as a hardware security module.

Figure 5:
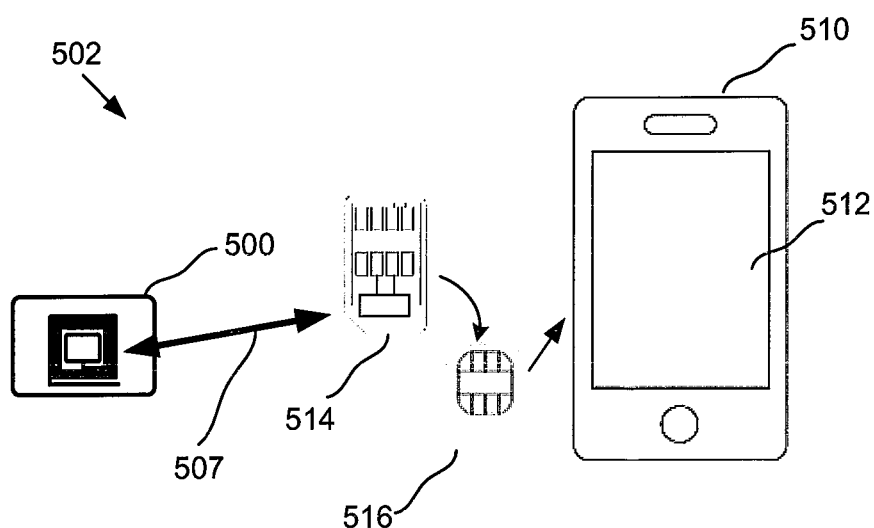
FIG. 5 is a block diagram which illustrates a dynamic object tag being interrogated by an interrogation device according to another embodiment of the invention.

FIG. 5 is a block diagram which illustrates system (502) according to embodiments of the invention. The system (502) includes a dynamic object tag (500) and an interrogation device (510). In the illustrated embodiment, the interrogation device (510) is a mobile phone which does not have an integrated hardware security module but rather a hardware security module which is disposed in an adhesive label (514) to be applied directly to a communication component, being a SIM card (516). The adhesive label (514) is designed such that after it has been fitted to a SIM card (516), it cannot be removed without rendering it unusable. Once fitted onto a SIM card (516), the combination of the adhesive label and SIM card can be inserted into a SIM card slot of the interrogation device (510). The adhesive label (514) including electrical contacts such that the hardware security module of the adhesive label (514) is in electrical communication with the interrogation device (510). The adhesive label (514) incorporating its own hardware security module further includes its own communication module and is adapted to enable end-to-end secure communications (507) between the interrogation device (510) and the dynamic object tag (500).

In use, when the interrogation device (510) is brought in close proximity to the dynamic object tag (500) on the product, communication may be enabled between the hardware security module of the dynamic object tag and the hardware security module of the interrogation device. In one embodiment, a NFC module of the interrogation device (510) may energize an antenna, for example in the form of a NFC coil, of the dynamic object tag (500) and may enable communication.

The respective hardware security modules of the dynamic object tag and interrogation device may then perform a digital handshake by means of which mutual authentication may be conducted. If both the dynamic object tag hardware security module and interrogation device hardware security module have positively authenticated one another, a secure communications channel (507) may be established between them by means of which further communication may be done. The dynamic object tag (500) and interrogation device (510) may also exchange encryption keys over the communication channel (507) by means of which further communication between them may be encrypted. The encryption keys may be generated using a variable number and calculated by means of a suitable encryption algorithm, thus ensuring that encryption keys differ for each interrogation session. Once the encryption keys have been exchanged, the dynamic object tag (500) hardware security module may encrypt the product information stored on the dynamic object tag storage module and transmits it to the interrogation device (510) over the secure communication channel (507) which, in turn, decrypts the product information and displays it on a screen (512) of the device (510) where it can be read by the user.

In some embodiments, the encryption and/or decryption keys of the hardware security modules of the dynamic object tags and the interrogation devices respectively may be unique to their corresponding devices. It may be appreciated that in such an embodiment, due to the handshake being conducted between two uniquely identifiable hardware security modules, the first being associated with the dynamic object tag and the second with the interrogation device, and due to the variable encryption keys exchanged between the hardware security modules, each response by the dynamic object tag to an interrogation may be dynamic and unique. This feature clearly distinguishes the dynamic object tag from other currently available product identification technologies which provide static responses to interrogation devices. This renders the response of the dynamic object tag hard to anticipate and/or replicate and ensures that the product's authenticity, status and other product information can be verified by any person or entity in possession of a valid interrogation device.

Figure 6A:
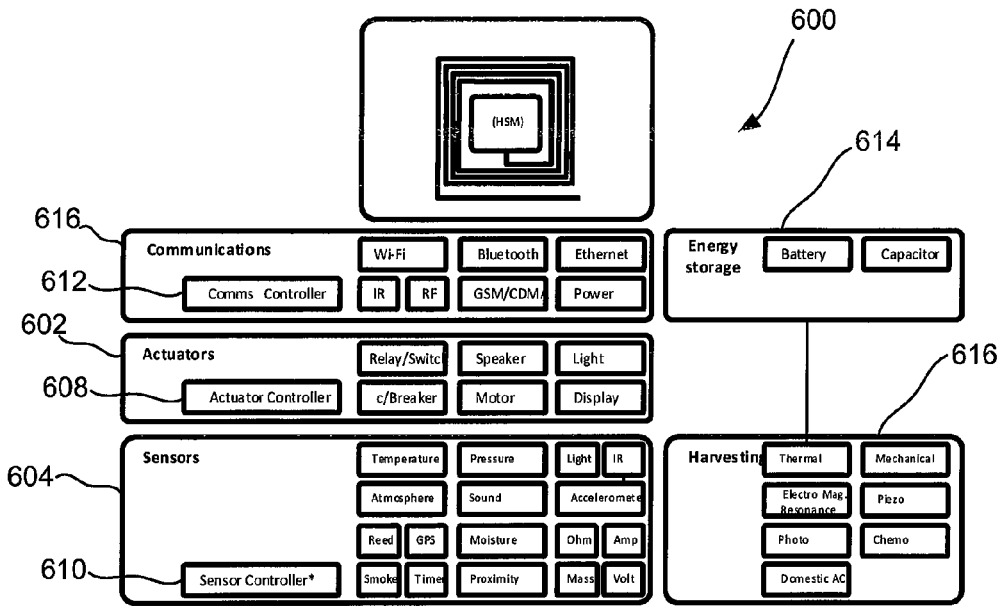
FIG. 6A is a block diagram illustrating components of a dynamic object tag according to another embodiment of the invention.

FIG. 6A is a block diagram illustrating components of a dynamic object tag according to another embodiment of the invention. In the illustrated embodiment, the dynamic object tag (600) may also be configured with one or more actuators (602) and/or one or more sensors (604) by means of which the dynamic object tag may interact with its environment. The sensors (602) and actuators (604) may, for example, include temperature sensors, movement sensors, atmospheric sensors, reed sensors/switches, smoke detectors, global positioning system (GPS) modules, timing sensors, pressure sensors, sound detectors and/or speakers, moisture sensors, proximity sensors, light sensors, Infra-Red sensors, current sensors, voltage sensors, weight sensors, volume sensors, relays or switches, circuit breakers, speakers, motors or other movement actuators, lights and electronic display units. The dynamic object tag (600) may also be provided with additional communication modules (606) which may include Wi-Fi, IR, RF, Bluetooth, GSM/CDMA or Ethernet interfaces. Each group of sensors (604), actuators (602) and/or communication modules (606) may also be controlled by means of a suitable controller (608, 610, 612).

The sensors (602) on the dynamic object tag (600) may detect events which affect the product associated with the dynamic object tag (600). The events may affect the attributes of the product and such information may be stored in the storage module of the dynamic object tag (600) for communication with an interrogation device.

In one example, the sensors (602) may be used to detect when the product has been exposed to certain undesirable environmental factors such as excessive temperatures or rough or excessive handling, or when the product has passed its sell-by date. When these conditions are detected, the dynamic object tag (600) may activate a warning signal which may be displayed to a user when the dynamic object tag is interrogated. This will not only enable a user being a consumer to make a more informed decision about whether or not to purchase the product, but may also provide feedback to a user being a retailer, by means of a remotely accessible server, regarding the statuses of certain products. The information may also be used by the retailer to make decisions about the price point at which the product should be sold. So, for example, similar products at different stages of their useful life may be offered by the retailer at different prices, thereby giving the consumer the choice of whether to buy a product with a longer or shorter remaining lifetime at a corresponding price.

For example, by including a temperature sensor in the dynamic object tag (600), the dynamic object tag (600) may then be operable to detect an event, in this case a temperature to which the product is exposed and which falls outside of the predetermined tolerable threshold and to store this detection in the storage module.

In another embodiment of the invention, a GPS module may be included as one of the sensors (604) in the dynamic object tag (600). The GPS module is monitored by the dynamic object tag (600) and the associated location data recorded in the storage module. The operator can then determine, upon interrogation using an authorized interrogation device, the location history of the product since its production.

In a further embodiment of the invention, one or more sensors (604) of the dynamic object tag (600) may be configured to detect an event intimating theft or tampering of the associated product. Upon such detection, the dynamic object tag (600) may activate one or more actuators (602) being configured to lock closed, render unusable, spoil or otherwise compromise the product, such that a thief having stolen the product is unable to make use of the product or otherwise benefit from the theft thereof.

As further shown in FIG. 6A, the dynamic object tag may also be provided with additional or alternative energy storage (614) and/or harvesting (616) components. These may, for example, include batteries or capacitor banks in the case of energy storage, and thermal, electro-magnetic resonance, photo, domestic AC, mechanical, piezo, or chemical energy harvesting devices.

A dynamic object tag described with reference to FIG. 6A therefore makes it possible for a retailer to not only monitor stock quantities and movement, but also to monitor other key attributes of products such as its remaining shelf life, quality, condition and status.

Figure 6B:
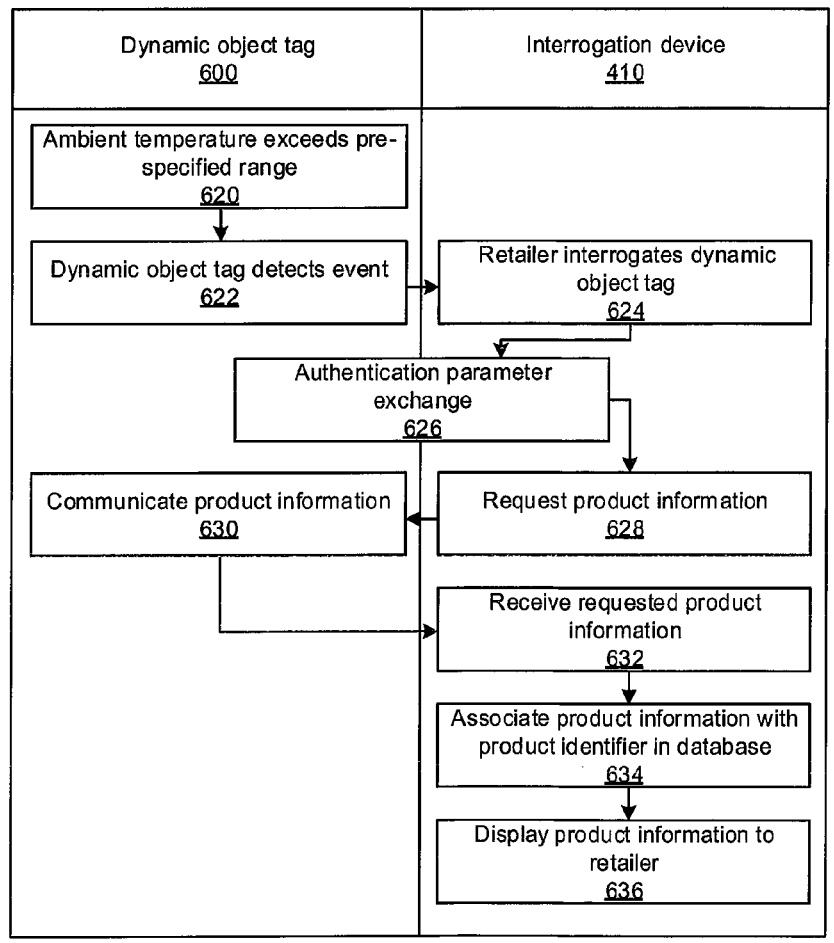
FIG. 6B is a swim-lane flowchart which illustrates in a step-by-step fashion an exemplary use-case of systems according to embodiments of the invention.

FIG. 6B is a swim-lane flowchart which illustrates in a step-by-step fashion an exemplary use case of a system such as the systems (402, 502) described above with reference to FIGS. 4A and 5. In the illustrated embodiment, the interrogation device (410) is configured to store product information relating to a plurality of products on sale in a retail environment. Each of the products has a dynamic object tag (400, 500, 600) which may be provided with one or more sensors and/or actuators (602, 604).

In the exemplary scenario, at a first step (620), a product, having a dynamic object tag (600) with a temperature sensor, may be exposed to a temperature outside of a pre-specified temperature range. The dynamic object tag (600), in a next step (622), detects the event and records such detection in a storage module thereof. At a next step (624), a retailer having an interrogation device such as an interrogation device (410, 510) described above with reference to FIGS. 4A, 4B and 5 interrogates the dynamic object tag (600) using the interrogation device (410). The interrogation device (410) and dynamic object tag (600) establish a secure communication channel with a dynamic object tag (600). During the interrogation, the dynamic object tag (600) and the interrogation device (410) exchange dynamic authentication parameters in a next step (626) to enable secure communication between the dynamic object tag and the interrogation device. In a next interrogation step (628), the interrogation device (410) requests product information from the dynamic object tag (600). In a following interrogation step (630), the dynamic object tag communicates the product information, including the event, to the interrogation device via the secure communication channel. In a final interrogation step (632), the interrogation device receives the requested product information over the secure communication channel. The interrogation device (410) may then, at a next step (634), associate the received product information with a product identifier in a database of the interrogation device (410) and in a final step (636) may display the product information, including the event, to the retailer on a display screen thereof. The retailer may then be informed that the product may be spoiled as a result of being exposed to a temperature outside of the pre-specified temperature range.

Thus the systems (402, 502) of FIGS. 4B and 5 may be used as an inventory management system or the like. It is appreciated that various other parameters, events and the like according to aspects of the invention may similarly be monitored and a retailer informed subsequent to interrogating the products.

Figure 7A:
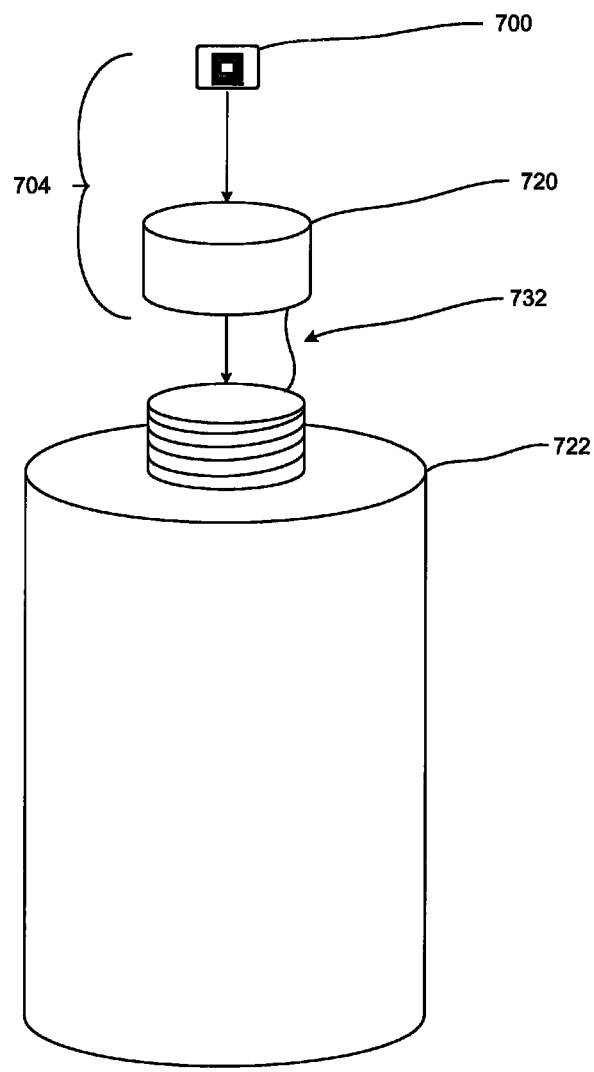
FIG. 7A is an exploded three dimensional view of a container and a tamper evidencing closure according to embodiments of the invention.

FIG. 7A illustrates an embodiment of the invention in which a dynamic object tag (700), such as that described above with reference to FIG. 6, is integrated into a conventional body of a closure (720) for a product container (722), which is configured to seal the container in conventional fashion, the assembly forming a tamper evidencing closure (704). The dynamic object tag may include one or more sensors or actuators as well as sensor and/or actuator controllers in data communication with the dynamic object tag (700). The sensors and/or actuators may be one or more of the group of sensors and actuators described above with reference to FIG. 6 and may be integrated into the tamper evidencing closure (704).

The sensors may be monitored by the dynamic object tag (700) via the sensor controller. The dynamic object tag (700) may be operable to detect certain predetermined events via one or more sensors. A predetermined event may, for example, be a sensor measurement which lies outside of a predetermined threshold which has been set for that sensor. Such an event might be indicative of either product tampering or exposure of the product container to detrimental environmental conditions which might adversely affect the integrity of the product. The detections of any events may be stored in the electronic storage module of the dynamic object tag for later communication.

The intention of providing a closure with an integrated dynamic object tag for sealing a product container is to enhance the tamper protection and evidencing of the product.

Figure 7B:
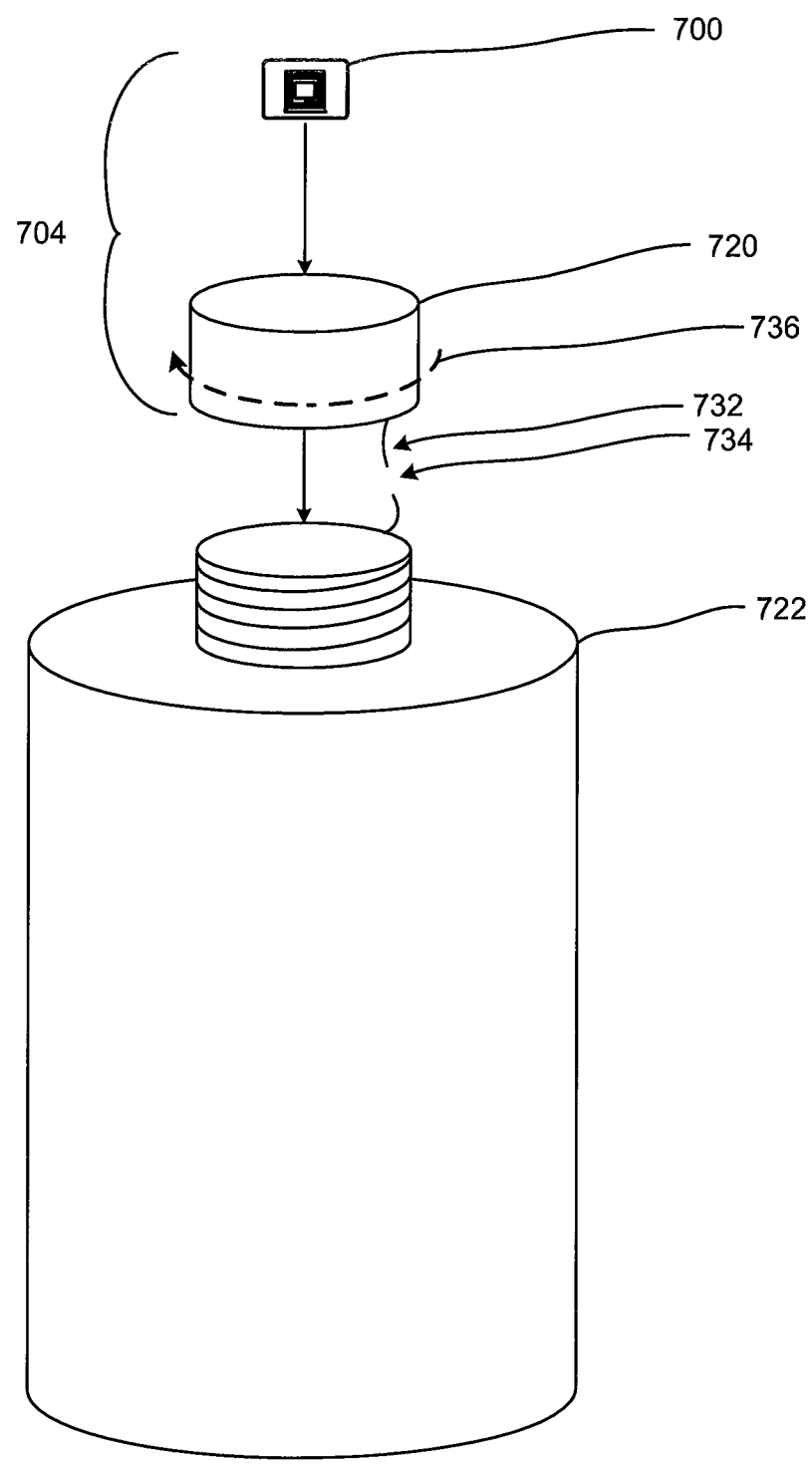
FIG. 7B is an exploded three dimensional view of a container and a tamper evidencing closure in a second state according to embodiments of the invention.

In the embodiment illustrated in FIG. 7A, a sensor may be a frangible magnetic strip (732) positioned between the closure (704) and the container (722). The frangible magnetic strip may be configured to tear or break in the event that the closure (704) is moved or twisted relative to the container (722). FIG. 7B illustrates the closure (704) being moved (722) relative to the container. This movement results in a tear (734) in the frangible magnetic strip (732). The dynamic object tag (700) may be configured to detect the event corresponding to the tearing of this frangible magnetic strip and to store this detection in the storage module.

In another embodiment of the invention, a sensor includes a component which is attached to the container of the product. By enabling this component to be in any one of electrical, magnetic, optical, or mechanical communication with the sensor, the dynamic object tag may be configured to detect the closure moving, or to have moved, relative to the container and to classify such relative movement as an event, as it may be indicative of tampering with the closure. It should be appreciated that the sensor may be configured to sense incremental movement and that any relative movement between the closure and the container above a predetermined minimum amount may be considered as tampering. This will accommodate potential normal movement that may occur during transport and handling of the product.

In another implementation of this embodiment of the invention, a sensor may be a proximity switch. The proximity switch may include a first component which is attached to the container of the product and a second component which may be incorporated in the closure. The two components of the proximity switch are positioned proximate one another. The dynamic object tag may be, in turn, configured to detect the event corresponding to a change in the proximity of the first and second components of the proximity switch and to store this detection in the storage module as an event.

Similarly, in another embodiment of the invention, a pressure sensor may be included in the tamper evidencing closure. By monitoring this sensor, the dynamic object tag may be operable to detect an event, in this case a drop in the internal pressure of the product container. The detection of this event may be deemed to correspond to, amongst other things, a breaking of the product seal and may be stored in the storage module as an event intimating a compromise of the closure seal.

In addition to tamper evidencing, the invention may be employed to assess or monitor additional aspects of product integrity. For instance, some products require a cold chain to be maintained from the production stage through to the resale stage. This involves ensuring that the products are not exposed to temperatures falling outside of a predetermined tolerance by refrigerating the product containers during transportation and storage. A temporary break in this cold chain, during which the product container is exposed to a temperature that falls outside the product's tolerable temperature range, might cause the product to spoil. This spoiling could go undetected until the product has been sold to a consumer.

By including a temperature sensor in the tamper evidencing closure, to be monitored by the dynamic object tag, the dynamic object tag is then operable to detect an event, in this case a temperature to which the product is exposed and which falls outside of the predetermined tolerable threshold and to store this detection in the storage module.

In another embodiment of the invention, a GPS module may be included as one of the sensors in the tamper evidencing closure. The GPS module is monitored by the dynamic object tag and the associated location data recorded in the storage module. The operator can then determine, upon interrogation using the authorized interrogation device, the location history of the product since its production.

Embodiments of the invention further provide for an actuator, such as any one or more of the group described above with reference to FIG. 6, to be included in the closure (704). In one embodiment of the invention the actuator may be operable to lock the closure (704) of the container (722) on instructions from the dynamic object tag (700) upon detection of tampering with or the expiration of the product by the sensors.

In a further embodiment of the invention, sensors and actuators may be provided to further protect consumers from spoiled goods. By including a biological sensor, the dynamic object tag may be operable to detect an event corresponding to the release of certain predetermined chemicals or biological agents by the product. By deeming the release of these predetermined substances to be harmful or indicative of a spoiled product, the dynamic object tag may be configured to lock the closure by means of the actuators and a locking mechanism so as to prevent the release of these harmful chemicals. A locked product will, in turn, indicate to the consumer that the product has been compromised and should not be consumed.

Thus, by including any one or a plurality of the aforementioned sensors and actuators, the tamper evidencing closure may, by utilizing the dynamic object tag, communicate to an operator operating an authorized interrogation device, various aspects of the product integrity.

As mentioned above, power harvesting may be performed on NFC or RFID interrogation devices. However, it is anticipated that at least some embodiments of the invention, the sensors or actuators may require a constant power source. As such power harvesting in its simplest form may not be sufficient and, to overcome this, a power module may be included to provide the sensors with the requisite power. The power module may be implemented using power storage mediums such as, by way of non-limiting example, batteries or capacitors, or could comprise thermal, electromagnetic or mechanical power harvesting components.

Figure 8:
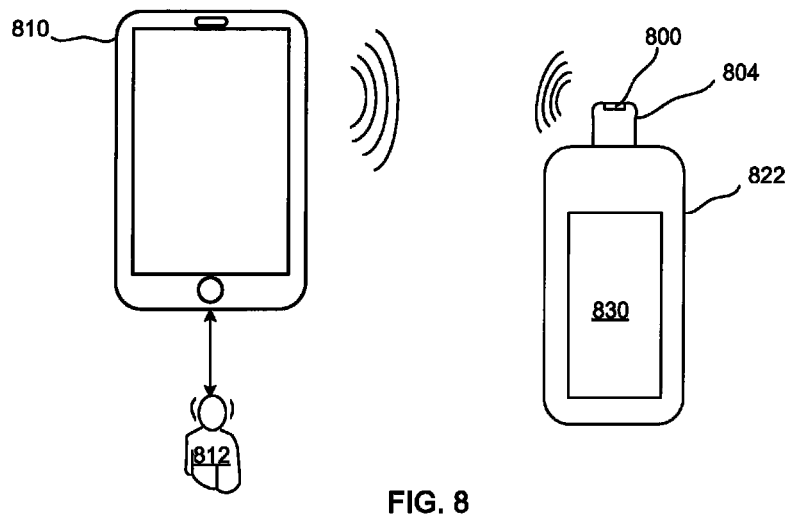
FIG. 8 is a block diagram illustrating a tamper evidencing closure being in close proximity to an interrogation device according to embodiments of the invention.

FIG. 8 is a block diagram illustrating a tamper evidencing closure (804) sealing a container (822) of a product (830) in conventional fashion container. The figure further illustrates an interrogation device (810) interrogating the tamper evidencing container. The interrogation device (810) is within communication range of the tamper evidencing closure (804) and its associated dynamic object tag (800). When the interrogation device (810) is brought within communication range of the tamper evidencing closure (804), the dynamic object tag (800) enclosed within the tamper evidencing closure (804) may be energized and a secure communication link between the interrogation device (810) and the dynamic object tag (800) may be established. The interrogation device (810) and dynamic object tag (800) may authenticate each other and exchange relevant encryption decryption keys according to procedures described in the foregoing description. Once the interrogation device (810) and dynamic object tag have authenticated each other, the relevant information stored on the storage module of the dynamic object tag, including product information and event information, is then securely transmitted to the authorized interrogation device (810) for interpretation by a user (812) of the interrogation device (810).

Further alternative embodiments of the invention also provide for the dynamic object tag to be configured to operate with camera enabled interrogation devices which may also conduct barcode identification and/or image matching on the products that are being interrogated.

It is also envisaged that the dynamic object tag may be secured to a product shelf instead of to the product itself. In this way the dynamic object tag may not be used to provide product authenticity but merely to correctly identify the product or to obtain more detailed information about it. Dynamic object tag shelf identification may also be used by a retailer to monitor consumer interest in a particular product, even if the product is currently out of stock, and to potentially direct consumers to available alternatives.

It should be appreciated that the functionality of the interrogation device and, in particular, its interaction with the consumer and remotely accessible server may be provided by way of a suitable software application installed and operating on the interrogation device. The remotely accessible server may also be hosted in a dedicated data center and may be connected with peripheral payment networks.

It is further anticipated that a dynamic object tag, according to various embodiments of the invention, be associated with or secured to a product being a protected storage device for storing digital data. The dynamic object tag may be configured to communicate with at least one paired interrogation device having a secure element or more preferably a its own hardware security module. The hardware security module of a dynamic object tag associated with such a data protected storage device may be configured to provide access by the interrogation device to the stored digital data or to decrypt the digital data for communication to the interrogation device. Exemplary storage mediums include, compact discs (CDs), digital versatile discs (DVDs), Blue-Ray® discs (BDs) and the like. In some embodiments, storage mediums may include memory chips (e.g., RAM, ROM, flash, etc.) such as those implemented in portable memory drives (e.g., flash drives, etc.), portable memory cards or sticks, etc.

Figure 9:
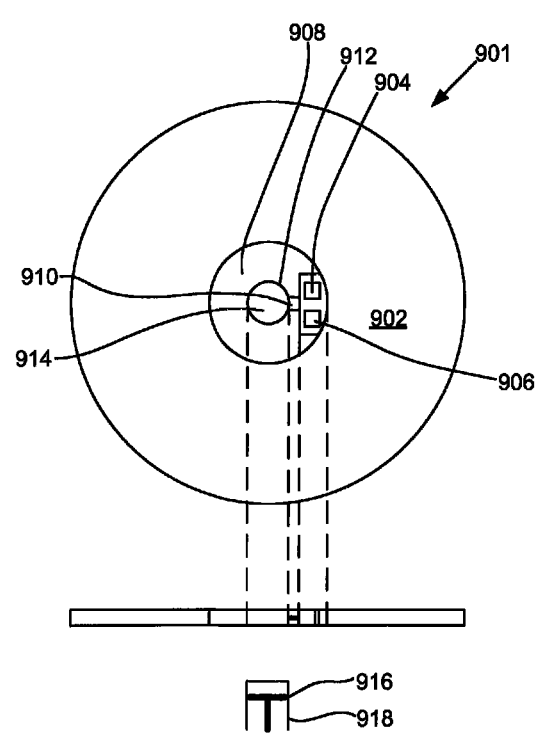
FIG. 9 is a top view of a data protected storage device according to embodiments of the invention.
Figure 10:
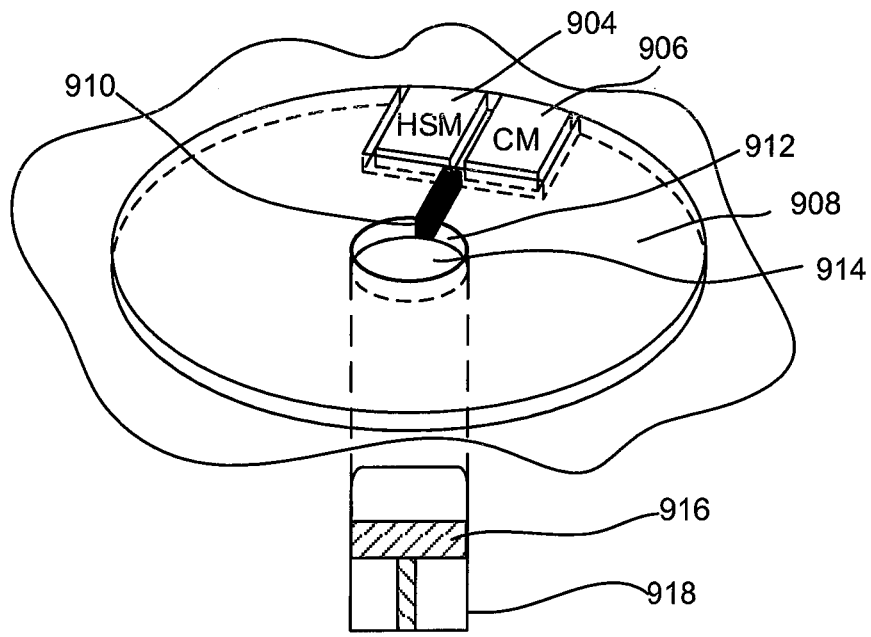
FIG. 10 is a perspective view of a data protected storage device according to embodiments of the invention.

FIGS. 9 and 10 show an exemplary data protected storage device (901) according to embodiments of the invention. In the illustrated embodiment, the data protected storage device may include a circular disc-shaped storage medium (902) of conventional kind on which digital data is stored. A hardware security module (904) and a communication module (906) comprising a dynamic object tag may be embedded in an inactive region (908) of the storage medium (902), commonly referred to as the stacking ring, and may be in electronic communication with one another.

An electronic contactor (910) may also be embedded in the stacking ring (908) and extends from an inner edge (912)

thereof, defined by the spindle hole (914) of the storage medium (902), to the hardware security module (904) and communication module (906). The contactor (910) may be configured to align and contact a complementary contactor (916) on a drive shaft (918) of an interrogation device, which in this example is a storage medium reader device, such as a DVD reader or player. The data protected storage device (901) may be further configured to harvest power for the hardware security module (904) and communication module (906) from, and also to communicate with, the interrogation device through the contactors (910, 916). For this purpose the data protected storage device (901) may include a power harvesting component which may also be embedded in the stacking ring (908). The power harvesting component may therefore draw power from the interrogation device through the contactors (910, 916) to power the hardware security module (904) and communication module (906).

The digital data may be stored on the storage medium (902) in an encrypted format. The device hardware security module (904) may be, in turn, configured to decrypt the stored digital data using secure cryptographic keys known only to the hardware security module (904). It should be appreciated that the hardware security module (904) may utilize hardware to decrypt the encrypted data instead of solely performing the decryption in software as has been described in the foregoing description. Such hardware-based decryption may provide enhanced protection over conventional software decryption technologies.

Figure 11:
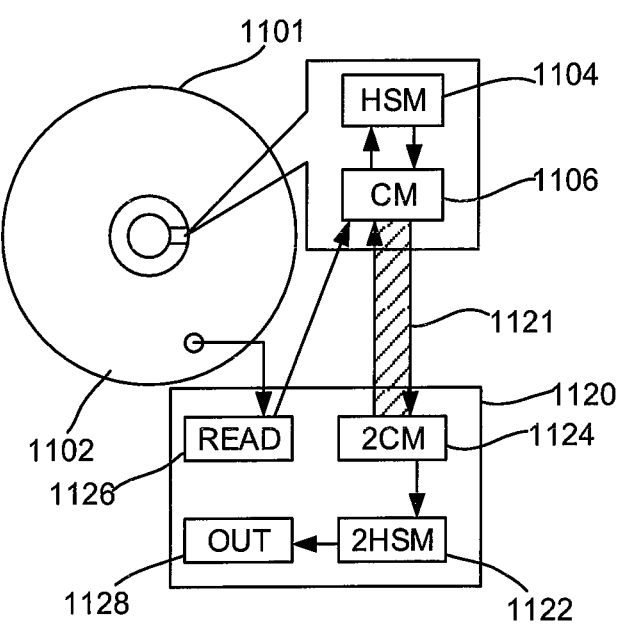
FIG. 11 is a schematic block diagram which illustrates a data protected storage device being read by an authenticated interrogation device.

FIG. 11 is a schematic block diagram which illustrates a data protected storage device (1101) being read by an authenticated interrogation device (1120). Encrypted data stored on the data protected storage device (1101) may be read by an authorized interrogation device (1120) having its own hardware security module (1122). When the data protected storage device (1101) is brought into proximity to the interrogation device (1120), which in some embodiments of the invention may include the data protected storage device (1101) being inserted into the interrogation device (1120), the data protected storage device hardware security module (1104) and data protected storage device communication module (1106) may be powered through contactors disposed on the data protected storage device (1101) and a drive shaft (1118) of the interrogation device (1120). The respective hardware security modules (1104 and 1122) may then perform a digital handshake through their respective communication modules (1106, 1124) as has been described in the foregoing description. During the digital handshake the respective hardware security modules (1104 and 1122) may be mutually authenticated and exchange cryptographic keys. If mutual authentication is successful, the hardware security modules may pair and establish a secure communication channel (1121) between them. Once the secure channel has been established, encrypted data on the device (1101) may be read or otherwise obtained by the interrogation device (1120). To do so, the device reads the encrypted data from the storage medium (1102) using a conventional reading assembly (1126), which is typically a lens assembly. The encrypted data may then be transmitted to the data protected storage device hardware security module (1104) where it may be decrypted and the decrypted data forwarded to the data protected storage device communication module (1106). The decrypted data may thereafter be transmitted to the interrogation device communication module (1124) and ultimately the interrogation device hardware security module (1122) over the secure channel. Upon receipt of the decrypted data by the secondary device it may be output (1128) by the interrogation device in conventional fashion.

It is apparent that in the embodiment described, data decryption may be conducted by the data protected storage device hardware security module (1104). As decryption will only be done by the data protected storage device hardware security module (1104) following a successful handshake between the respective hardware security modules (1104, 1122) and a successful pairing, the decrypted data may also be transmitted from the device communication module (1106) directly to the secondary device output module (1128) instead of over the secure channel between the hardware security modules. The data protected storage device hardware security module (1104) may, however, be configured to only allow data decryption to take place for as long as the secure channel between the respective hardware security modules is operational. As soon as the data protected storage device (1101) is removed from the interrogation device (1120), the secure channel may be terminated and decryption will immediately be stopped. The data protected storage device (1101) will accordingly only be readable by an interrogation device which has been preconfigured with an authorized hardware security module and/or appropriate cryptographic keys. Decryption of data by the data protected storage device hardware security module (1104) will typically be performed in real time as and when it is read and transmitted to it by the interrogation device reading assembly (1126), and output by the secondary device immediately after decryption. The interrogation device (1120) may, however, be configured to read encrypted data from the storage medium (1102) ahead of it being needed by the interrogation device (1120), to transmit the encrypted data to the data protected storage device hardware security module (1104) for decryption, and to temporarily store or buffer the decrypted data in an interrogation device data storage module associated with the interrogation device (1120) for output at a later stage. It should be appreciated that in such situations, the interrogation device data storage module may be configured to erase decrypted data stored or buffered therein immediately upon termination of the secure communication channel between hardware security modules of the data protected storage device (1101) and interrogation device (1120).

Figure 12:
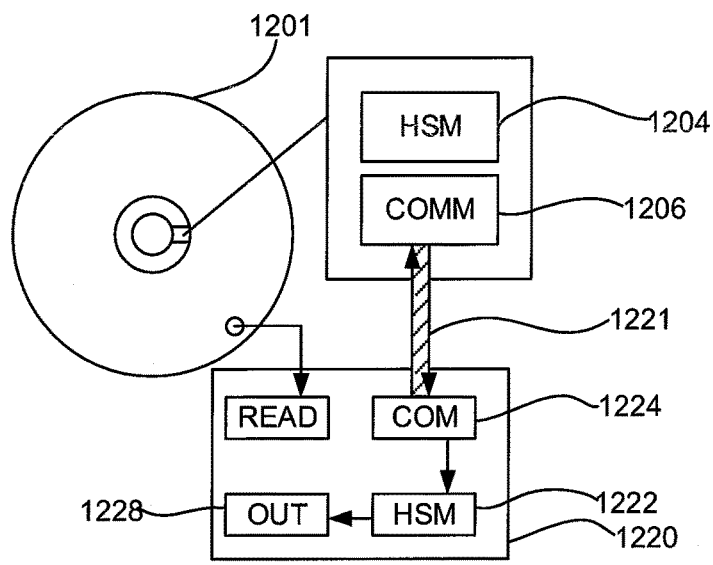
FIG. 12 is a schematic block diagram which illustrates a data protected storage device being read by an authenticated interrogation device according to an alternative embodiment of the invention.

FIG. 12 is a schematic block diagram which illustrates a data protected storage device (1201) being read by an authenticated interrogation device (1220) according to an alternative embodiment of the invention. In this embodiment decryption of the encrypted data stored on the data protected storage device (1201) may be conducted at the interrogation device hardware security module (1222). Upon loading the data protected storage device (1201) in the interrogation device (1220), the data protected storage device hardware security module (1204) and interrogation device hardware security module (1222) perform a handshake communicating through their respective communication modules (1206 and 1224) and conduct mutual authentication and paring between the respective hardware security modules (1204 and 1222). If mutual authentication and pairing is successful, the hardware security modules (1204 and 1222) establish a secure communication channel (1221) between them via which the data protected storage device hardware security module (1204) transmits decryption keys to the interrogation device hardware security module (1222) which may be used by the interrogation device hardware security module (1222) to decrypt the stored data. Once the decryption keys have been exchanged the interrogation device may read and decrypt the encrypted data from the data protected storage device (1201) without further interaction from the data protected storage device hardware security module (1204). It should, however, be appreciated that the interrogation device (1220) may be configured to store the decryption keys only for as long as the secure communication channel (1221) remains active, and to permanently erase the decryption keys as soon as the secure communication channel (1221) is terminated.

In alternate embodiments of the invention, an interrogation device hardware security module may also be configured to communicate with an output module over a direct, secured communication link, thereby preventing interception of the decrypted data being communicated to an output module of the interrogation device.

Figure 13:
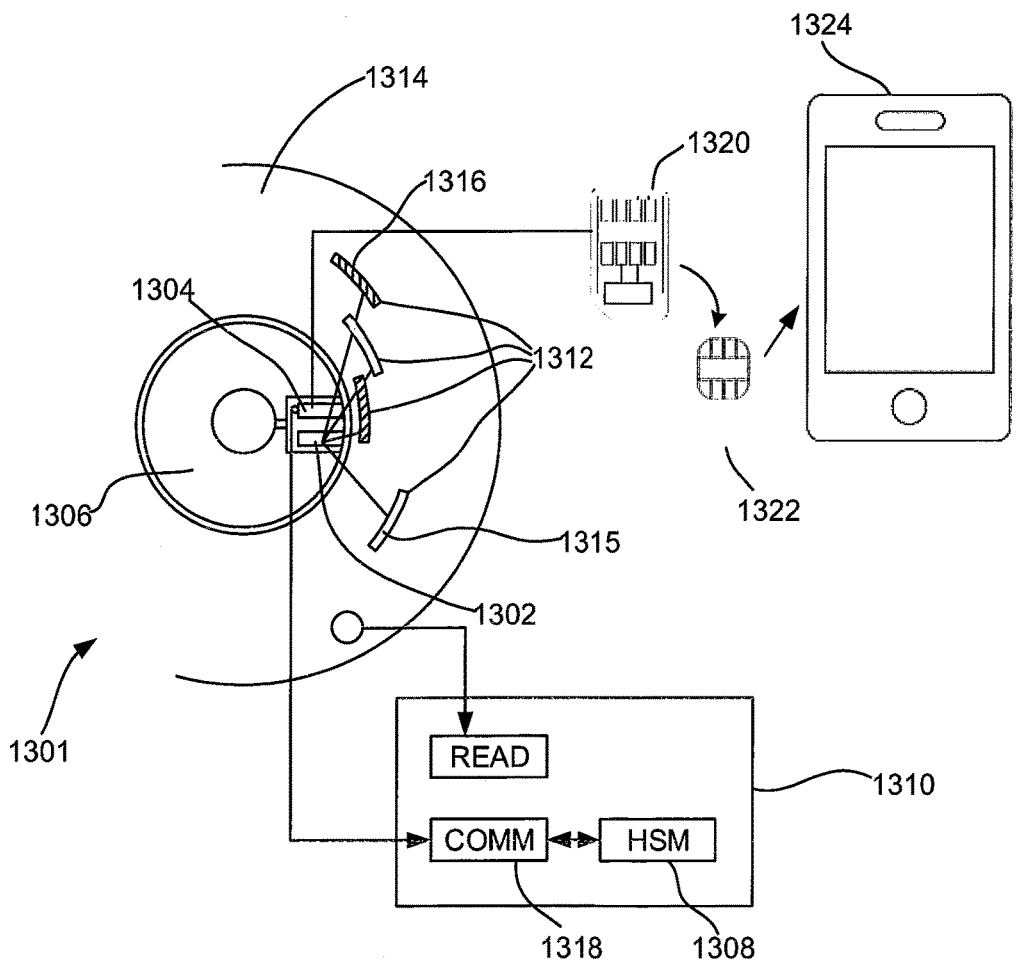
FIG. 13 illustrates a data protected storage device and interrogation devices according to another embodiment of the invention.

FIG. 13 illustrates a data protected storage device (1301) according to another embodiment of the invention. The data protected storage device (1301) again has a hardware security module (1302) and communication module (1304) forming a dynamic object tab embedded in a stacking ring (1306) of the data protected storage device (1301). The hardware security module (1302) and communication module (1304) may be configured to communicate with a hardware security module (1308) of an interrogation device (1310) configured to read the data from the data protected storage device (1301). The data protected storage device (1301) may include a series of actuators being electrophoretic ink (E-Ink) strips (1312) spaced apart over the surface of the storage medium (1314). Each of the E-ink strips is positioned directly above one or more data tracks of the storage medium (1314) and are electronically connected to the data protected storage device hardware security module (1302). The E-ink strips (1312) are operable to selectively expose and obscure the data tracks (1312) positioned below them. Responsive to receiving an expose or obscure instruction from the data protected storage data protected storage device hardware security module (1302), the E-Ink regions (1312) may turn transparent (1315) or opaque (1316), as the case may be, thereby either exposing or obscuring tracks being situated behind the E-ink regions (1312).

In use and in an initial unpaired state, the data protected storage device hardware security module (1302) may be configured to obscure the selected regions of the data protected storage device (1301). Upon inserting the data storage data protected storage device (1301) into the interrogation device (1310), the data protected storage device hardware security module (1302) and interrogation device hardware security module (1308) perform a digital handshake communicating through their respective communication modules (1304, 1318) and conduct mutual authentication of their respective hardware security modules. If mutual authentication is successful, the respective hardware security modules pair and establish a secure communication channel between them as has been described in the foregoing description. The data protected storage device hardware security module (1302) then causes E-Ink regions (1312) to assume a transparent state. The interrogation device (1310) may then continue to read the data from the data protected storage device (1301) as described above.

The illustration of FIG. 13 further includes a block representation of a second interrogation device (1324) being a mobile phone and having a hardware security module disposed within an adhesive label (1320). It is of course anticipated that any other suitable interrogation device having an embedded hardware security module or the like and an appropriate communication interface may similarly be used. The adhesive label (1320) of this embodiment has been applied directly to a SIM card (1322), or any other suitable communication component such as a memory card, that can be inserted into the interrogation device (1324). The adhesive label (1320) is designed such that after it has been fitted to a particular SIM card (1322), the adhesive label cannot be removed without rendering it unusable. Once fitted onto a SIM card, the combination of the adhesive label and SIM card (1320, 1322) can be inserted into a SIM card slot of the interrogation device (1324). The adhesive label (1320) includes its own communication module and is adapted to enable the interrogation device (1324) to communicate securely with other suitable devices, in particular other devices having hardware security modules and may make use any appropriate communication protocol of which the interrogation device is capable including, for example, near field communication (NFC), Bluetooth, Wi-Fi, or any other appropriate radio frequency (RF) or optical communication channel.

In the above described embodiment, when the interrogation device (1324) including the adhesive label with an embedded hardware security module (1320) is brought into close proximity to the storage data protected storage device (1301), an antenna and/or communication module of the interrogation device (1324) cause a power harvesting module of the data protected storage device (1301) to be energized, thus enabling the data protected storage device hardware security module (1302) and interrogation device hardware security module (1320) to communicate with each other by via their respective communication modules. The hardware security modules (1302, 1320) of the data protected storage device (1301) and interrogation device (1324) respectively then perform handshake and pairing operations and authentication each other. Once paired, the data protected storage device hardware security module (1302) causes the E-Ink regions (1312) to assume a transparent state, thereby rendering data on the data protected storage device (1301) readable by any suitable conventional reader, such as an optical disc drive, DVD or BD player or the like.

It should be appreciated that following a successful pairing with an interrogation device hardware security module (1320), the data protected storage device hardware security module (1302) may cause the E-Ink regions to remain transparent for a predetermined period of time thereby rendering the data protected storage device (1301) readable only during that period of time. Alternatively, the interrogation device (1324) may again be brought in proximity to the data protected storage device (1301) after it has been used and the data protected storage device hardware security module (1302) may instruct the E-Ink regions to turn opaque following a second successful pairing with the hardware security module of the interrogation device (1324). In this way the data protected storage device (1301) may be rendered readable and unreadable by an authorized interrogation device which may be associated with an authorized user.

It is foreseen that the current embodiment of the invention may require the data protected storage device (1301) to be used in conjunction with both an interrogation device (1310) being a storage medium reader device as well as an interrogation device (1324) being a mobile device such as a mobile phone. In such an embodiment, each of the data protected storage device (1301), the storage medium interrogation device (1310) and mobile interrogation device (1324) having their own hardware security module modules. The data protected storage device (1301) may then be configured to be readable only by the storage medium interrogation device (1310) subsequent to E-Ink regions (1312) on the data protected storage device have been rendered transparent following a successful pairing between the data protected storage device hardware security module (1302) and the hardware security module (1320) of the mobile interrogation device (1324), as well as a subsequent successful pairing between the data protected storage device hardware security module (1302) and a storage medium interrogation device hardware security module (1308).

Numerous modifications to the current embodiment of the invention are foreseen which could add to the functionality of the data protected storage device. It is, for example, foreseen that the data protected storage device hardware security module (1302) may be configured to expose different E-Ink regions depending on an identity of an interrogation device or devices' hardware security module(s) (1320 or 1308). In this way, different users, each having their own interrogation device, may be able to access different areas of the storage medium (1314), depending, for example, on their security clearance, license key(s) in their possession and the like. It is also foreseen that the E-Ink region may, for example, cover the entire index portion of the storage medium (1314), thereby rendering the entire storage medium unreadable when the E-Ink region is opaque.

In a further alternative application of the current embodiment of the invention, the data protected storage device hardware security module (1302) may be configured to receive an activation or license key from a mobile interrogation device hardware security module (1320) with which it is paired. The data protected storage device hardware security module (1302) may then be operable to validate the activation or license key and provide access to the data on the storage medium only if the activation or license key can be validated. This application will, for example, allow distributors of software to print generic data disks containing the software and distribute them to intended users. If a user wishes to access the software, he or she will be required to purchase a license key from the software owner. The license key may then be transmitted to the user's interrogation device over a GSM network. In order to access the data on the storage medium the user has simply to bring his or her interrogation device in which an applicable license key is stored, into close proximity with to storage device. The data protected storage device hardware security module (1302) and interrogation device hardware security module (1320) will then conduct a handshake and pair as has been previously described, and the license key may then be transferred from the interrogation device hardware security module to the data protected storage device hardware security module, where it can be validated by the data protected storage device hardware security module and, response to a successful validation, obscured E-Ink regions may be caused to be revealed. In this way only users with valid license keys will be able to access and use the software.

In a further application of the present embodiment of the invention, users may secure the data on storage devices and share access codes to the devices with other users. The access codes may be shared with the other users from their interrogation devices by any suitable means such as, for example, SMS, MMS, Bluetooth transfer, Wi-Fi, NFC and the like. Once the access codes have been shared, the storage device may be exchanged between the users and only users with the correct access codes on their interrogation devices will be able to access the data on the storage device. It should be appreciated that in this way users may also give other users access to specific storage devices remotely. The data on a storage device may, for example, be obscured by a first user by the user bringing it in proximity to his or her interrogation device, after which the storage device may be sent to a second user. When the second user receives the device the first user may transmit the access code corresponding to the data protected storage device to an interrogation device of the second user, after which the data on the storage device may be revealed by the second user bringing his or her interrogation device, containing the relevant access code, proximate to the device.

It is foreseen that the contactors on the storage device and drive shaft may be excluded and the communication modules on the storage device and interrogation device may be configured to communicate wirelessly. In addition, the power harvesting component may be able to harvest wireless signals emanating from the interrogation device to provide power to the device hardware security module and communication module. These signals may include radio frequencies, or alternatively the power harvesting component may operate by receiving power from an NFC field provided by an interrogation device. Alternatively, the power harvesting component could be a photovoltaic cell which is able to transform solar energy into stored electrical energy.

It is further envisaged that the device hardware security module may be spaced about the stacking ring so as to keep the storage device balanced. This may improve the stability of the storage device whilst rotating around a driveshaft of a secondary device. Alternatively, counterweights may be provided at a location about the storage device sufficient to balance the storage device.

The dynamic object tag according to embodiments of the invention provides secure sensing, monitoring, interaction with and/or communication to resources in real time. This is achieved by the dynamic object tag being capable of being uniquely identified and of encrypting communication with an interrogation device that may optionally be verified by a remotely accessible server. Dynamic object tags according to the invention may be deployed as products providing authenticity and product monitoring, or they may be deployed as secure resource monitoring and control devices. It is, for example, envisaged that dynamic object tags may also be used to discourage theft, as the dynamic object tags of stolen goods may easily be blacklisted by the remotely accessible server, thus alerting consumers to the fact that goods they are interrogating have in fact been stolen.

The invention extends to a retail system, which includes a plurality of dynamic object tags according to various embodiments of the invention, a plurality of interrogation devices and a remotely accessible server and which may enable more effective product tracking to be performed by manufacturers, suppliers and retails and which may also boost marketing and promotion efficacy.

Figure 14A:
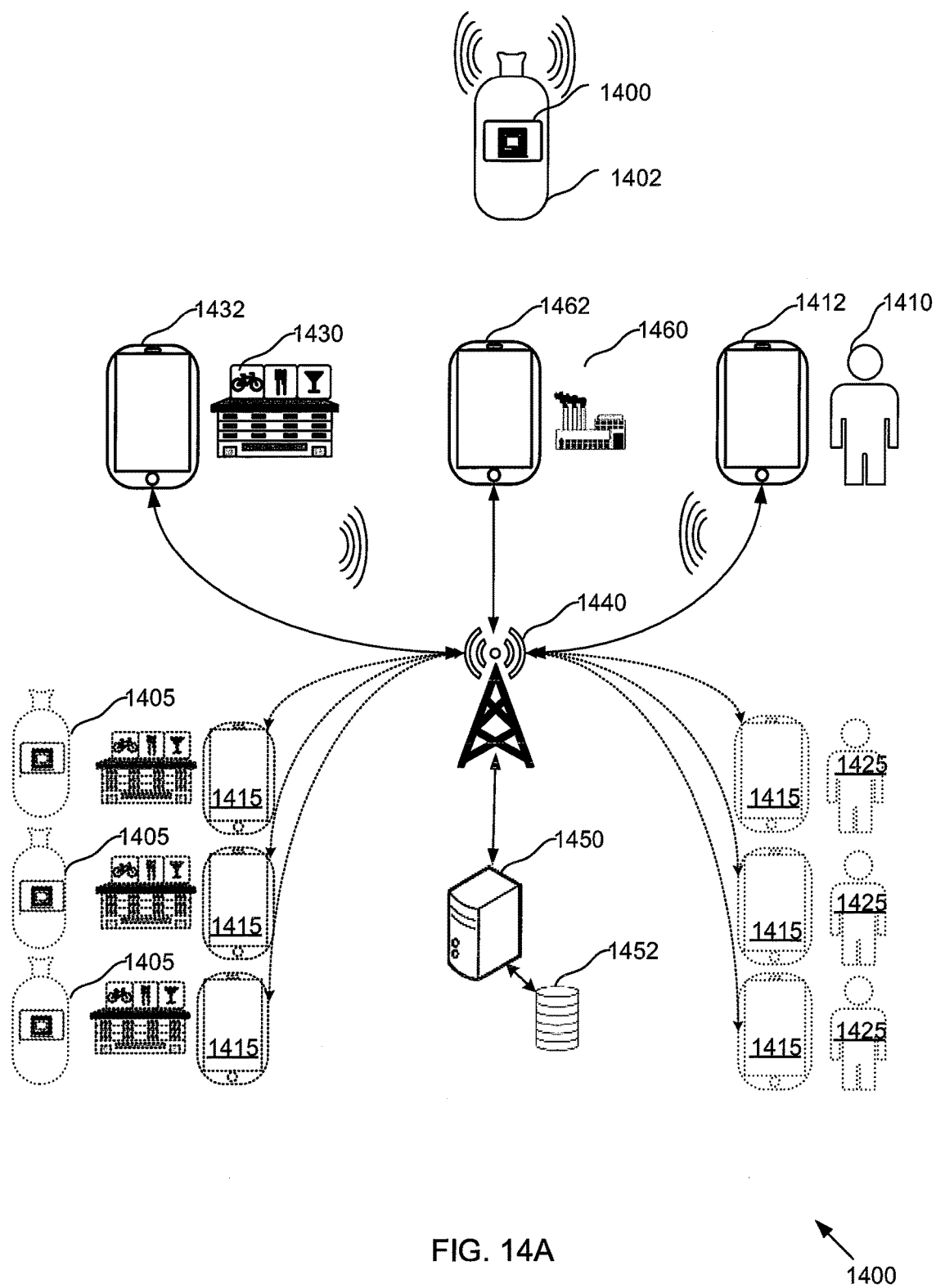
FIG. 14A is a block diagram which illustrates a retail system according to embodiments of the invention.

FIG. 14A is a block diagram which illustrates a system (1400) according to embodiments of the invention. The system (1400) includes a plurality of products (1405), each of which having a dynamic object tag, according to various embodiments of the invention, attached thereto, disposed in a tamper evidencing closure thereof or to packaging of the product. The system includes a plurality of interrogation devices (1415) and a remotely accessible server (1450). The system further includes a plurality of users. Users of the system may be consumers (1425, 1410), retailers (1430), product manufacturers (1460), or any other form of product handler. Each one of the interrogation devices may be in communication with the remotely accessible server and, in some embodiments of the invention, with any of the other interrogation devices via a communication network (1440). In some embodiments of the invention, the communication network is a localized Wi-Fi network associated with a retailer or other organisation or, alternatively, a mobile communications network.

The system (1400) will be described, by way of examples, with reference to a retailer (1430) having an interrogation device (1432) and offering a product (1402) for sale, a manufacturer (1460) having an interrogation device (1462) and having manufactured the product, and a user (1410) having an interrogation device (1412) which are illustrated by images having unbroken lines.

The product (1402) has a dynamic object tag (1400) which may be incorporated into packaging of the product, into the product itself, into a tamper evidencing closure or otherwise associated with the product. The dynamic object tag (1400) of the product has a hardware security module with an electronic storage module, and a communication module for communicating with an interrogation device (1415, 1432, 1462, 1412). The hardware security module may be adapted to establish a secure communication channel with an interrogation device (e.g. 1412), to exchange dynamic authentication parameters, which in some embodiments may include exchanging encryption keys, with the interrogation device (1412) by means of which communication between the dynamic object tag (1400) and the interrogation device (1412) may be encrypted, and to communicate product information stored on the storage module to the interrogation device (1412) in an encrypted format over the secure communication channel.

Product information which may be stored in the electronic storage module may include any one or more, where applicable, of the group of: an electronic product code; a product description; a product expiry date, best before date or sell by date; product ingredients; product allergens; product version; a product manufacture date; a product batch number; a stock-keeping unit; a serial number; a shelf life of the product; nutritional information of the product, and the like. The product information may also include event information relating to the experience or exposure of the product and any changed attributes of the product resulting from such events.

Each one of the plurality of interrogation devices (1415, 1432, 1462, 1412) may be associated with a respective user of the system and may have a unique digital user identifier associated with it. The interrogation devices (1415, 1432, 1462, 1412) may be operable to interrogate a dynamic object tag, to obtain product information including at least a product identifier from the dynamic object tag during the interrogation. Accordingly each interrogation device (e.g. 1412) may be configured to energize an antenna of the dynamic object tag (1400) and establish a secure communication channel with the dynamic object tag (1400). The interrogation device (1412) may then exchange dynamic authentication parameters, which in some embodiments may include exchanging encryption keys, with the dynamic object tag (1400) by means of which communication between the dynamic object tag (1400) and the interrogation device (1412) may be encrypted. The interrogation device (1412) may then request product information including at least a product identifier from the dynamic object tag (1400) and, in response to this request, may be configured to receive the requested product information from the dynamic object tag (1400) and to communicate the received product information and user identifier to the remotely accessible server (1450).

In some embodiments of the invention, each one of the plurality of interrogation devices may be configured to transmit a recommendation in respect of a product to one or more other interrogation devices. The recommendation may include at least the product identifier and a user identifier corresponding to the recommending interrogation device. Similarly, each one of the plurality of interrogation devices may be configured to receive a recommendation in respect of a product from one or more recommending interrogation devices, store the recommendation in a recommendation list, detect when a stored recommendation is acted upon and, upon such detection, communicate an action notification to the remotely accessible server. The action notification at least includes the product and user identifiers.

Embodiments of the invention anticipate the interrogation devices taking on various forms. Exemplary interrogation devices include any appropriate proximity communication enabled interrogation device, such as an NFC enabled mobile phone, smart phone, tablet computer, personal digital assistant, laptop computer, smart watch or other wearable computing device; any appropriately configured purpose built interrogation device, such as an NFC or RFID interrogation device; a merchant point of sale device, such as a point of sales device, a PIN entry device, a personal PIN entry device, a contactless payment acceptance terminal, or the like; a storage medium reader, such as an optical disc drive, DVD player, BD player, or the like; any appropriately configured home appliance, such as, a proximity communication enabled refrigerator, microwave, oven or the like.

It is anticipated that each interrogation device may have a mobile software application resident thereon which enables a user thereof to cause the interrogation device to perform any one of the abovementioned functions. The application may be resident and operating on the interrogation device and may be registered with a remotely accessible server in association with the user identifier. For instance the mobile application might facilitate the interrogating of the product in obtaining the product identifier and may cause an antenna and/or communication module of the interrogation device to energize and communicate, establish a secure communication channel, exchange cryptographic keys with a dynamic object tag or the like. The mobile application might also facilitate communicating a received product identifier and user identifier to the remotely accessible server or receiving an incentive from the remotely accessible server. The mobile software application may further facilitate the sending and receiving of product recommendations according to embodiments of the invention and may also cause the interrogation device to display an incentive to the consumer on a display screen thereof. The mobile application which may also communicate a consumer's acceptance or rejection of an incentive to the remotely accessible server and/or action notifications in respect of received product recommendations. The mobile application may also facilitate the identifying of a point-of-sales terminal or the communicating of a product identifier, user identifier or incentive to a point-of-sales terminal. The mobile application may also be configured to initiate the camera embedded with the interrogation device to allow the consumer to photograph a product, product barcode or a QR code associated with the product. The mobile application can then facilitate the communication of this image to the remotely accessible server for digital image processing and product identification.

The remotely accessible server (1450), may be in communication with the plurality of interrogation devices (1415, 1432, 1462, 1412) and may have a database (1452) in which a plurality of user profiles may be stored. The remotely accessible server (1450) may be configured to receive product information, including a product identifier, having been obtained from a dynamic object tag (1400) of a product by an interrogation device (1412), and a user identifier corresponding to the interrogation device (1412) from the interrogation device (1412), and retrieve a user profile from the database (1452) corresponding to the user identifier and store the product information in relation to the user profile.

Embodiments of the invention further provide for the remotely accessible server (1450) to be configured to determine, based at least on the product identifier received from the interrogation device (1412), the user profile corresponding to the interrogation device (1412), and a predetermined incentive strategy, an incentive which should be provided to a consumer (1410) of the interrogation device to incentivize the purchasing of the product (1402) or associated products. The remotely accessible server (1450) may be configured to communicate the incentive to the interrogation device (1412) via a communication network for display to the user (1410). The incentive may include a discount on the purchase price of the product (1402), or a discount on one or more associated products. It is also anticipated that the user profile may include one or more of information on consumer spend history, consumer purchase history, consumer spend frequency, and consumer economic value. In yet further embodiments, it is anticipated that the remotely accessible server is configured to receive the action notification from a recommendee interrogation device, to identify a recommending interrogation device and a recommended product from a user identifier and product identifier included in the action notification, and provide an incentive to a user of the recommending interrogation device for recommending the product.

The remotely accessible server may be further configured to store product rules in association with product information at the remotely accessible server. In some embodiments, a product rule may refer to a set of one or more conditions or criteria detected by one or more sensors that correspond to an event experienced by the product. Product rules may for example be pre-specified temperature ranges to which the product may be exposed, rules relating to theft and the like. In some embodiments, the condition or criteria of a product rule may include more than one type of sensor.

Figure 14B:
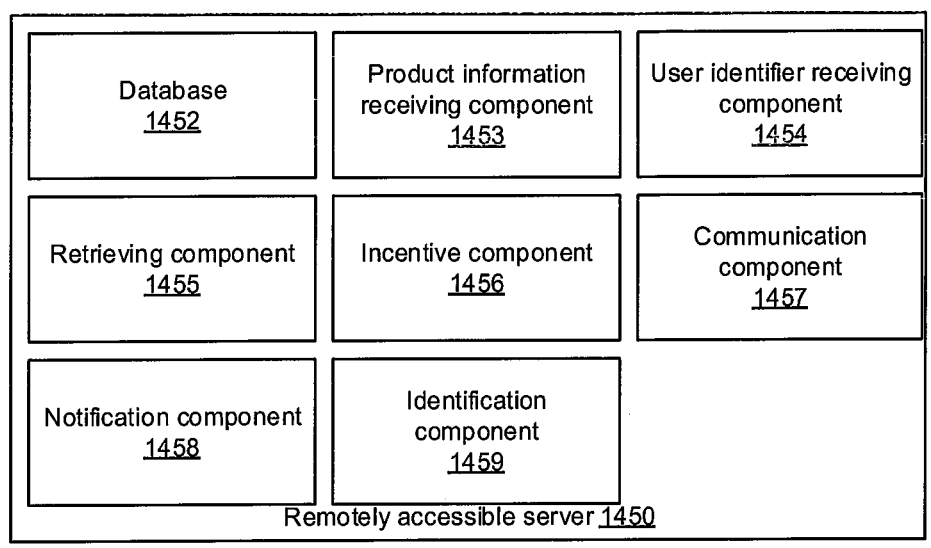
FIG. 14B is a block diagram illustrating components of a remotely accessible sever according to embodiments of the invention.

FIG. 14B is a block diagram illustrating components of a remotely accessible sever (1450) according to embodiments of the invention. The remotely accessible server may have a database (1452) for storing product information, user profiles product profiles and the like. The remotely accessible server (1450) may also include a product information receiving component (1453) and a user identifier receiving component (1454). In some embodiments the product information receiving component (1453) and the user identifier receiving component (1454) are implemented as the same component. The remotely accessible server may further include a retrieving component (1455) for retrieving a user profile stored within the database (1452). Embodiments of the invention further provide that the remotely accessible server may include an incentive component (1456) for determining an incentive as well as a communication component (1457) for communicating an incentive to an interrogation device. The remotely accessible server (1450) may still further include an action notification component (1458) for receiving action notifications as well as an identification component (1459) for identifying a user profile corresponding to a user identifier.

The dynamic object tags (1400, 1405) according to embodiments of the invention may thus enable more effective product tracking to be performed by a manufacturer (1460), suppliers and retailers (1430), as products provided with dynamic object tags (1400, 1405) may be individually identified as they move along the supply chain.

For example, once a product (1402) is manufactured by a product manufacturer (1460), the product is registered with the remotely accessible server (1450), for example in association with a product profile stored in the database (1452) thereof, and is allocated a universal electronic product code ("EPC"). The EPC and possibly other information relating to the product, such as its manufacturing date, expiry date, and the like are then written to a dynamic object tag (1400), which is secured to the product (1402) before it is distributed to a retailer (1430).

When the product (1402) is displayed on a shelf in a retail outlet, a consumer (1410) uses his or her suitably configured interrogation device (1412) to interrogate the dynamic object tag (1400) of the product (1202). As described above according to embodiments of the invention, the interrogation device (1412) should be configured with a hardware security module and other functionality enabling it to communicate with the dynamic object tag (1400). When the consumer (1410) brings the interrogation device (1412) in proximity to the product dynamic object tag (1400), the respective hardware security modules on the dynamic object tag (1400) and interrogation device (1412) establish a secure communication channel between them and the dynamic object tag (1400) encrypts the product EPC and transmits it to the interrogation device (1412). The interrogation device (1412) in turn transmits the uniquely encrypted product code to the remotely accessible server (1450) which decrypts the EPC and queries the database (1452) so as to identify the corresponding product profile such that the remotely accessible server (1450) may authenticate the product and the EPC thereof. If the remotely accessible server (1450) is able to authenticate the EPC, a confirmation code as well as possibly other information about the product is transmitted by the remotely accessible server (1450) to the user's interrogation device (1412) for display to the user on a display screen thereof.

It should be appreciated that the encrypted EPC sent by the dynamic object tag to the interrogation device may constitute a variable authentication code which may be specific to the product and the device interrogating it. In this way, the remotely accessible server may also gather information about the interrogation device and, accordingly, the user. The system therefore enables the remotely accessible server to gather valuable additional information about the products that are being interrogated and ultimately purchased, but also about the consumers doing so. It is foreseen that consumers would typically have to register their encryption devices with a service provider to enable them to make use of the system described, and that during the registration process personal information about the consumer may be gathered. Consumers may also be issued with unique consumer identification numbers during the registration process, which may be used by the system for later identification of the consumer. In this way, retailers may conduct valuable statistical analysis about the retail process and consumer habits, and may also be able to tailor consumer experiences directly.

Due to the fact that the remotely accessible server may return customized information to the interrogation device following a dynamic object tag interrogation, the system enables retailers to personalize the consumer shopping experience in a way that was not previously possible. Retailers may, for example, offer personalized product information, marketing information or even individual pricing structures (e.g., discounts, bulk purchase incentives, etc.) to consumers at the point of shelf, based at least to some extent on the previous behavior of the consumer. The consumer may also be able to enter into price negotiations with the retailer at the point of shelf and may be offered the choice of accepting or rejecting an offered price from his or her mobile phone when the product dynamic object tag is interrogated. In this way the retailer may be enabled to personalize the price offer based on the consumers' response as well as a variety of additional factors. It is also envisaged that the remotely accessible server may keep a running total of the offers accepted by a consumer during a given shopping session and that the consumer may check out and pay for the selected items by simply bringing his or her hardware security module enabled mobile phone in proximity to a payment module at the checkout point.

Figure 15:
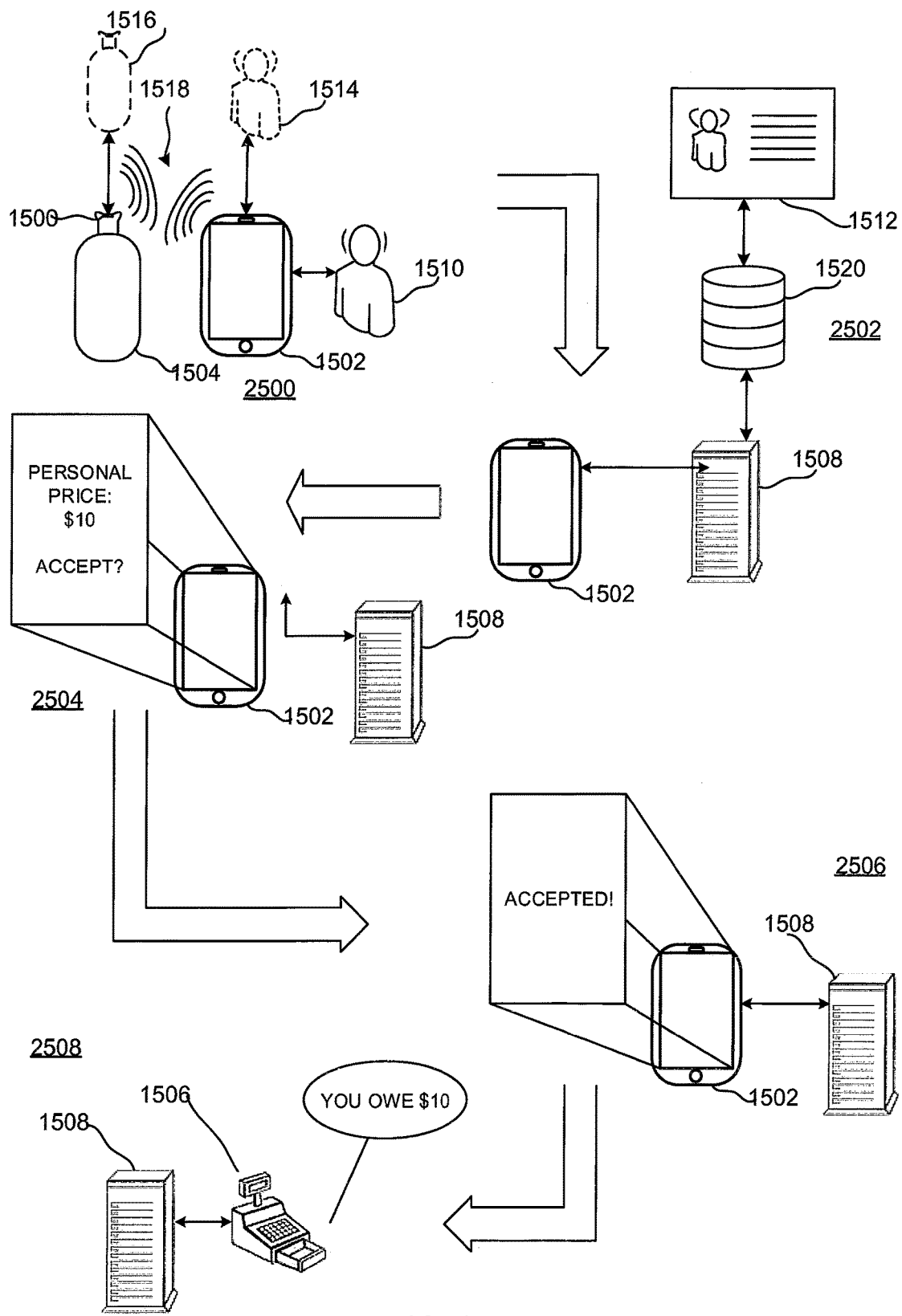
FIG. 15 is a block diagram which illustrates step-by-step the operation of a system according to embodiments of the invention.

FIG. 15 is a block diagram which illustrates step-by-step the operation of a system, such as that system described above with reference to FIG. 14. In a first step (2500), a product (1504) to be sold in a conventional, brick-and-mortar retail environment is shown. A dynamic object tag (1500) is attached to packaging of the product and has at least a product identifier (1516) associated with it. The dynamic object tag (1500) is fixed to the product packaging and contains information relating to the product including a product identifier. A consumer (1510) in possession of an interrogation device (1502) having associated with it a user identifier (1514) can then interrogate (118) the dynamic object tag (1500) using the interrogation device (1502) and in doing so obtains the product identifier.

In further embodiments, the product information may include images of the product or parts of the product or images relating to the product. Images may be provided for the product identification and may be performed by imaging the product using a digital camera incorporated in the interrogation device, and communicating the image to a remotely accessible server for digital image recognition and product identification. In a further example, a bar code may be imaged and communicated to the remotely accessible server for product identification. Similarly, a quick response (QR) code containing generic or specific product information may be affixed to the product, or the shelf to allow for product identification. The imaging may be done by the interrogation device.

At a next step (2502), the remotely accessible server (1508) receives the product identifier (1516) and the user identifier (1514) communicated to it by the interrogation device (1502). The remotely accessible server (1508) then identifies a corresponding user profile (1512) by querying a database (1520), which is associated with the remotely accessible server (1508), using the received user identifier (1514). The user profile (1512) contains information relating to the consumer, for example, his or her average monthly spend, spending frequency, spending dynamics or any other relevant analytics or statistics that the retailer is able to obtain about the consumer. It might also contain information provided by the consumer such as, for example, product or brand preferences, dietary requirements, allergies, and the like.

The remotely accessible server (1520) may then calculate an incentive to be offered to the consumer (1510), and redeemable should he or she purchase the product (1516), at a step (2504). The calculation takes into consideration the product identifier (1514), the user profile (1512), and a predetermined retailer or manufacturer incentive strategy, which could be part of a retailer marketing strategy. For example, the retailer's marketing strategy may be to incentivize loyal consumers in an attempt to retain them. The marketing strategy could thus offer loyal consumers more substantial discounts on particular products. The choice of products might be based on any number of factors while the loyalty of a consumer could be determined based on information such as spend history, average monthly spend and spend frequency. It should be appreciated that this information is specific to the consumer and is stored against the user profile. Thus, receiving the product identifier and user profile information, the remotely accessible server is operable to calculate an incentive by comparing this data to a set of rules dictated by the marketing strategy. The incentive is then communicated to the consumer's interrogation device for display by the device to the consumer.

The consumer can then reject the incentive or accept it. It is anticipated that should the consumer reject the incentive, the remotely accessible server could be operable to provide a revised incentive. Thus, a virtual negotiation can take place between the consumer and the remotely accessible server until an agreement is met. The extent to which the remotely accessible server offers further incentives might also be determined by the remotely accessible server in consultation with the marketing strategy. Should the consumer accept the incentive, a message confirming this acceptance is communicated to the remotely accessible server and stored in association with the product identifier and the user identifier.

At a final step (2508), the consumer proceeds to checkout by presenting the product at a point-of-sale (POS) terminal (1506). In one embodiment of the invention, the POS terminal (1506) obtains the product identifier by interrogating the dynamic object tag (1500). The POS terminal (1506) then communicates the product identifier to the remotely accessible server (1508). The remotely accessible server (1508) associates this product identifier with the user identifier and an entry which was created at the acceptance stage. In doing so, the remotely accessible server (1508) obtains the incentive which was accepted by the consumer (1510). In the case that the incentive is a discount on the product being purchased, the point of sales terminal (1506) reflects this as the new price payable by the consumer (1510). As such, a personal price for the product is offered to the consumer based on their value to the retailer.

In addition to the personal price incentive offered to the consumer in respect of the product that he or she wishes to purchase, the incentive may also include a discount offered on the purchase prices of associated products which will be passed on to the consumer if those products are purchased at the same time. It should be appreciated that the additional product incentives may be offered to the consumer at the same time as offering the reduced price on the product being purchased, so as to allow the consumer to collect the additional products prior to check-out.

In an alternative embodiment of the invention, the incentive may only be offered to the consumer at the POS terminal upon checkout. In this embodiment, the consumer identifies him- or herself to the POS terminal using their interrogation device when checking out. This identification may include imaging a QR or OCR code presented at the terminal and containing a unique POS identifier. The interrogation device may then communicate the POS identifier and the user identifier to the remotely accessible server. At the same time, the POS terminal may communicate the product identifiers of the products being purchased to the remotely accessible server. The remotely accessible server may in turn be configured to associate the product identifiers to a user identifier using the common POS identifier, and using the methods described above, determine an incentive to offer the consumer on each of the products being purchased, or a single incentive on the combination of products as being purchased.

Alternatively, the POS terminal may obtain the user identifier from the consumer's interrogation device. This might be performed by scanning a QR or OCR code presented on the display of the interrogation device, or by means of a NFC "tap" or indeed any other communication method. The POS terminal may then communicate the relevant product identifiers and user identifier to the remotely accessible server for the determination of the incentive.

Figure 16A:
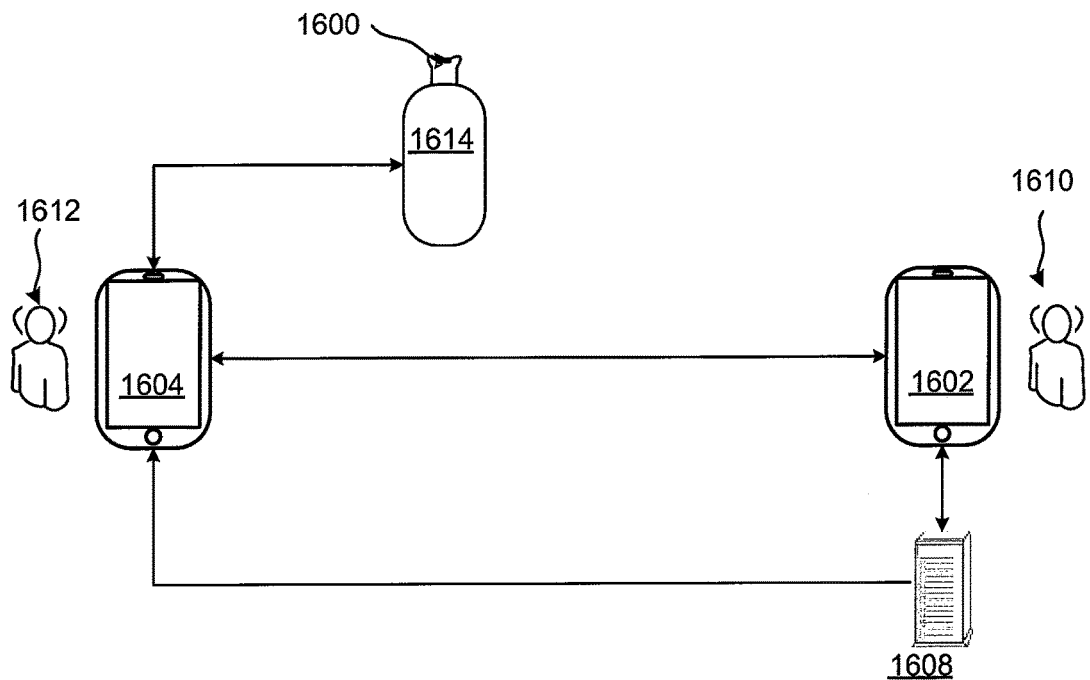
FIG. 16A is a block diagram illustrating a systems according to an embodiment of the invention.
Figure 16B:
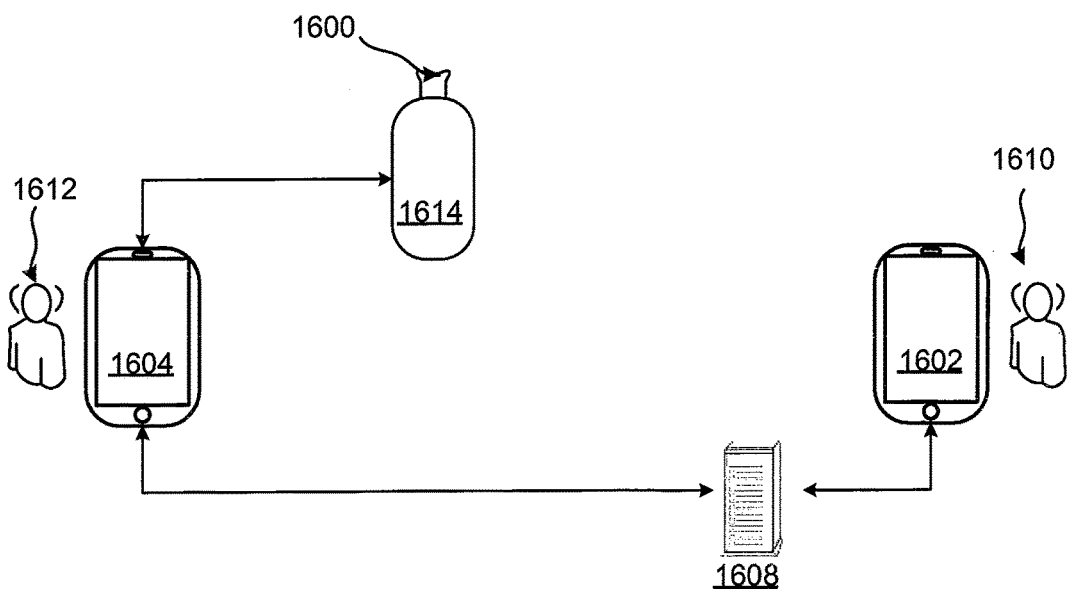
FIG. 16B is a block diagram illustrating a system according to another embodiment of the invention.

FIGS. 16A and 16B are block diagrams illustrating subsystems of the system described above with reference to FIG. 14A. The system comprises consumers (1610, 1612), each consumer having an interrogation device (1602, 1604) which has an associated user identifier. Each interrogation device is operable to send and receive product recommendations according to embodiments of the invention. The system further includes a remotely accessible server (1608) as well as a product (1614) having a dynamic object tag (1600).

In FIG. 16A, a recommending interrogation device (1604) is configured to communicates a recommendation directly to a recommendee communication device (1602). The recommendation includes at least the product identifier, having been obtained from the dynamic object tag (1600) of a product by the recommending interrogation device (1604), and a user identifier corresponding to the recommending interrogation device (1604). The recommendee interrogation device (1602) is configured to receive a recommendation in respect of the product (1614) from the recommending interrogation device (1604), to store the recommendation in a recommendation list, detect when a stored recommendation is acted upon and, upon such detection, communicate an action notification to the remotely accessible server (1608). The action notification at least includes the product and user identifiers. The remotely accessible server (1608) is configured to receive the action notification from the recommendee interrogation device (1602), to identify the recommending interrogation device (1604) and recommended product from the user identifier and product identifier included in the action notification, and provide an incentive to a user (1612) of the recommending interrogation device for recommending the product.

In the system of FIG. 16B, the recommending interrogation device (1604) is configured to communicate the recommendation to the recommendee interrogation device (1602) via the remotely accessible server (1608). The remotely accessible server (1608) is configured to receive the recommendation from the recommending interrogation device (1604) and to store in association with a user profile corresponding to either or both of the recommending and recommendee interrogation devices and to relay the recommendation to the recommendee interrogation device (1602). The remotely accessible server (1608) is further configured to detect when a user of the recommendee interrogation device (1602) acts upon the recommendation, and to provide an incentive to the user upon such detection according to embodiments of the invention.

Figure 17:
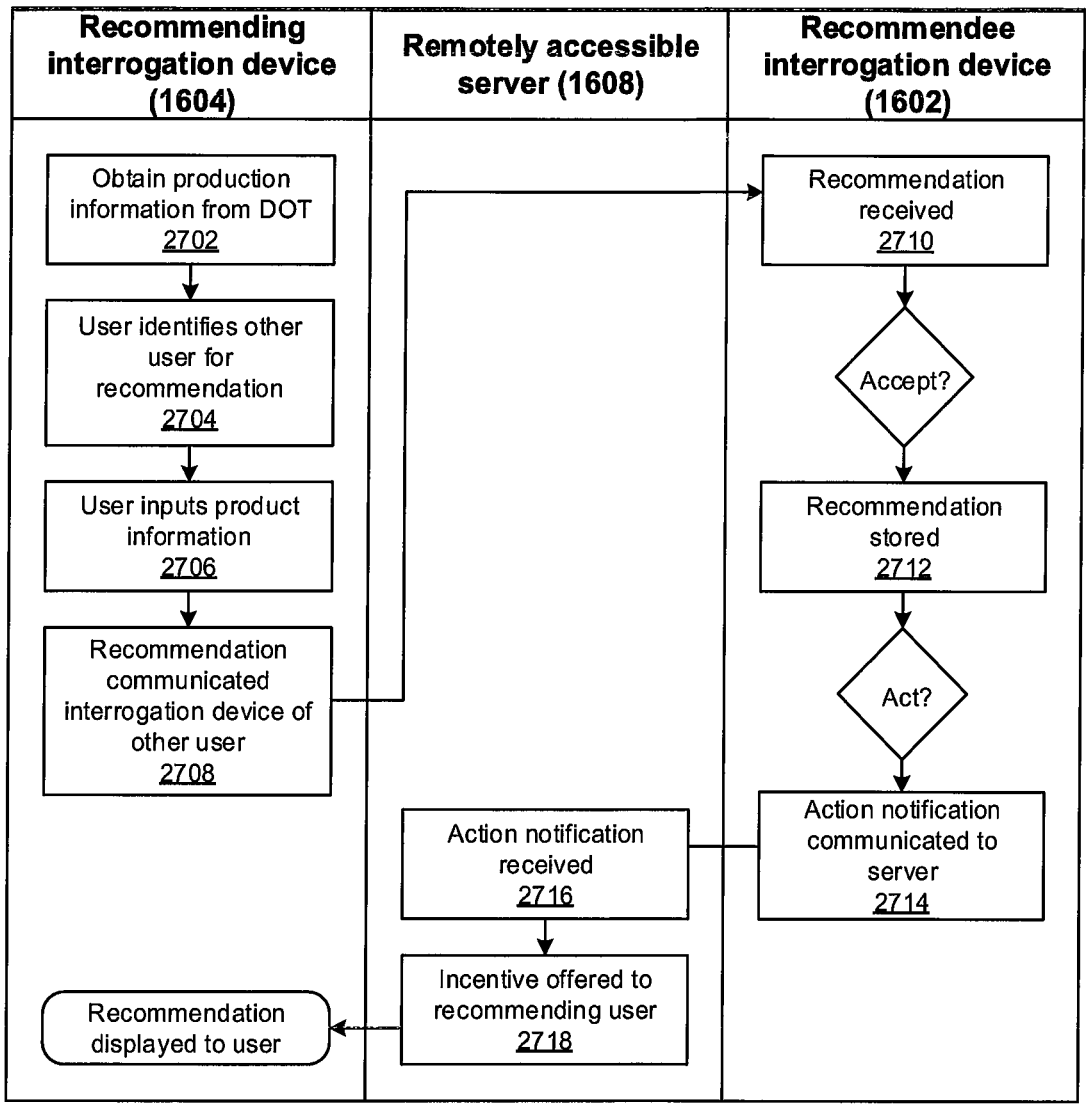
FIG. 17 is a swim-lane flowchart in which a system usage scenario is illustrated in a step-by-step fashion.

FIG. 17 is a swim-lane flowchart in which a usage scenario is illustrated in a step-by-step fashion, with individual swim lanes representing entities or devices performing the steps. At a first stage (2702), a user in a brick-and-mortar retail environment interrogates a dynamic object tag of a product being displayed on a shelf using his or her interrogation device (1604). In the interrogation processes the interrogation device obtains product information from the dynamic object tag, which may include a product identifier, such as an EPC. In other embodiments, the product identifier might be obtained by imaging the product bar code or the stock keeping unit code. Alternatively, image recognition might be performed to identify the product.

Having obtained the product information, a user of the interrogation device (1604) may then, at a next stage (2704) select one or more relevant contacts from a contact list being resident on his or her interrogation device (1604). The contacts may be other users of the system and are selected by the user as being individuals who may be interested in, or would benefit from the product. Each other user has his or her unique user identifier associated with their interrogation device. Embodiments of the invention also provide for the user receiving the recommendation, the receiving user, to not be users of the system and may receive the recommendation in a variety of ways.

A recommendation in respect of the interrogated product is entered by the user into his or her interrogation device (1604) at a next stage (2706). The recommendation, product identifier and user identifiers are then communicated, at a next stage (2708) from the recommending interrogation device (1604) of a recommendee interrogation device (1602) of the other user for presentation to the other user. The recommendation is received at the recommendee interrogation device (1602) at a next stage (2710) and, having been 'signed' digitally with the user identifier of the recommending user, is then recognizable to the user receiving the recommendation as having originated from the recommending user. The recommendation might be in the form of a personal message or a product rating.

The other, receiving user may then accept or decline the recommendation. Should the receiving user accept the recommendation, the recommendee interrogation device (1602) is configured to store, at a next stage (2712), the recommendation, recommending user identifier and product identifier in a recommendation list in his or her interrogation device (1602).

By taking into account the recommendation of the recommending user, the other, receiving user can then decide whether or not to purchase the product. Should the other user act on the recommendation, an action notification is communicated to the remotely accessible server (1608) at a next stage (2714). The action notification may contain at least the recommending user identifier and product identifier and optionally the user identifier of the receiving user, as well as the actual recommendation. The remotely accessible server (1608) receives the action notification in a following stage (2716) and is configured to identify the recommending user using the corresponding identifier and to offer, in a next stage (2718) the recommending user an incentive for having recommended the product. This incentive might be communicated to the interrogation device (1604) for display to the user.

It will be appreciated that the invention provides a system and method for providing an incentive to the user receiving the recommendation in addition to the user making the recommendation. For example, this might take on the form of redeeming a coupon or could be a cash-back paid into bank accounts corresponding to the users. For instance, the users might receive coupons which they may present to a retailer, the coupons including at least the user identifiers and incentive. This presentation might be to a point-of-sales terminal at the retailer and in the form of a QR code, OCR code, or NFC tab. The point-of-sales terminal may be in communication with the remotely accessible server.

Further, the incentive offered may be based on a turn-around time between the user receiving the recommendation and actually acting on it. The incentive might be structured to incentivize a fast turnaround time or alternatively a slower turnaround time.

User identifiers might be email address, MSISDN numbers, social network login or any other user account identifier, unique numeric or alpha-numeric sequence, or the like. The incentive might take on a variety of forms, one of which, for example, is a cash-back payment paid directly into a bank account of the user.

It is envisaged that a user of the system will receive recommendations for a plurality of products from a plurality of other users. To facilitate the conversion process from receiving a recommendation to purchasing the product, the user's interrogation device may be configured to provide periodic reminders the user of the products recommendations. These reminders may be triggered for certain products when, for instance, the user enters a retailer stocking those products. The user's mobile communication device may then remind the user of the recommended products, as well as any incentives or possible incentives on such products.

Figure 18A:
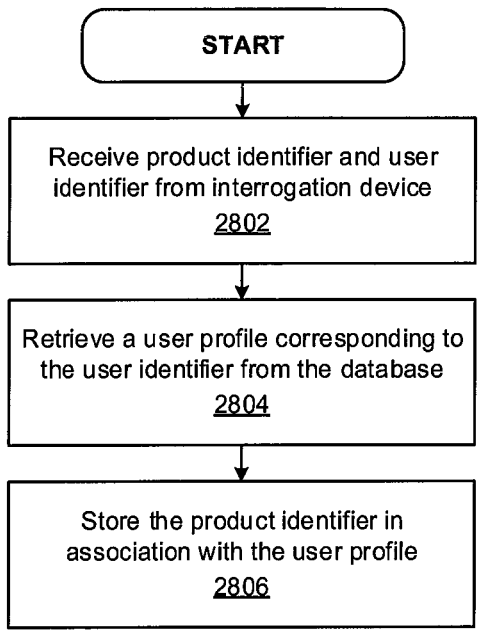
FIG. 18A is a flow diagram illustrating a method according to embodiments of the invention.

Embodiments of the invention provide a method which is conducted at a remotely accessible server, such a remotely accessible server is described in the foregoing description and may have a database in which a plurality of user profiles is stored. The method has a plurality of steps which are illustrated in the flow diagram of FIG. 18A. In a first step (2802), the remotely accessible server receives product information including a product identifier and a user identifier from an interrogation device which is associated with a user. The product identifier has been obtained from a dynamic object tag of a product by the interrogation device according to embodiments of the invention. In a next step (2804), the remotely accessible server retrieves a user profile corresponding to the user identifier from the database. This may include the steps of the remotely accessible server querying the database using the received user identifier so as to identify the corresponding user profile. The method provides a final step (2806) of the remotely accessible server storing the product information in association with the user profile in a digital storage thereof. The step (2804) of retrieving a user profile from the database corresponding to the user identifier may further include retrieving information on one or more of user spend history, user purchase history, user spend frequency, and user economic value; and for the steps of receiving the product and user identifiers and communicating the incentive to the interrogation device to include transmitting the information over a localized Wi-Fi network or mobile communication network.

Figure 18B:
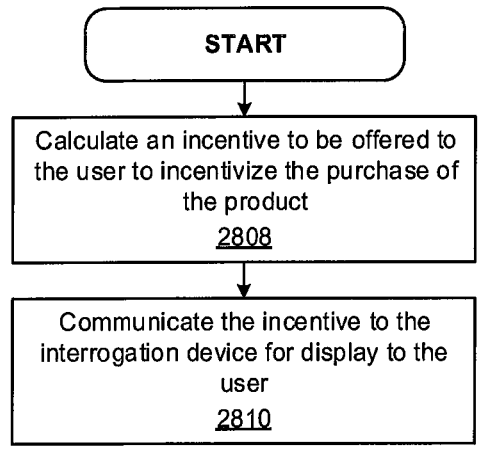
FIG. 18B is a flow diagram illustrating further steps of a method according to embodiments of the invention.

FIG. 18B is a flow diagram which illustrates additional steps which may be carried out that the remotely accessible server. The addition steps include a first additional step (2808) of calculating, based at least on the product identifier, the user profile, and a predetermined incentive strategy, an incentive to be offered to the user to incentivize the purchase of the product and/or one or more associated products. The calculations may be based on one or more of the group of: a marketing strategy; a retailer's or manufacturer's analytics, and a consumer economic value; and calculating a discount on a purchase price of the product, or a discount on one or more associated products. In a final additional step (2810), the remotely accessible server communicates the incentive to the interrogation device for display to the user.

Figure 18C:
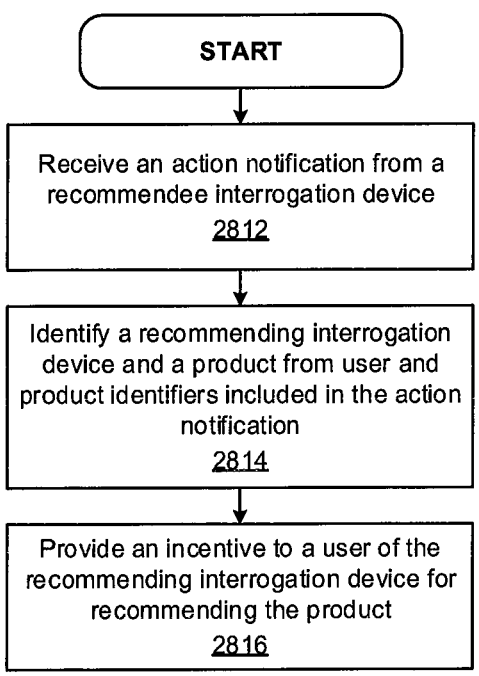
FIG. 18C is a flow diagram illustrating yet further steps of a method according to embodiments of the invention.

It is anticipated that the method may include yet further steps, which are illustrated in FIG. 18C and, a first of which is the step (2812) of receiving an action notification from a recommendee interrogation device, the action notification including an indication that a user of the recommendee interrogation device has acted upon a product recommendation, the product recommendation having been received by the recommendee interrogation device from a recommending interrogation device. The method extends to a next step (2814) of identifying the recommending interrogation device and a product from user and product identifiers included in the action notification and, in a final step (2816), providing an incentive to a user of the recommending interrogation device for recommending the product.

FIG. 19 is a flow diagram which illustrates an embodiment of a method for identifying a product, the method being conducted at an interrogation device having a unique digital user identifier. The method may include a first step (2902) of establishing a secure communication channel with a dynamic object tag, wherein the dynamic object tag has been incorporated into a product or packaging of a product on display in a retail environment. The method includes a next step (2904) of exchanging dynamic authentication parameters, such as encryption keys, with the dynamic object tag by means of which communication between the dynamic object tag and the interrogation device may be encrypted. In a following step (2906) of the method the interrogation device requests product information including at least a product identifier from the dynamic object tag and, in a next step (2908), receives the requested product information. Embodiments of the invention anticipate that the method may include a following step of communicating the received product information and user identifier to a remotely accessible server for association with a user profile.

FIG. 20 is a block diagram which illustrates an embodiment of a method which is conducted at a dynamic object tag being incorporated into respective products or packaging of respective products on display in a retail environment. The method includes a first step (2922) of establishing a secure communication channel with an interrogation device. The method includes a following step (2924) of exchanging dynamic authentication parameters, such as encryption keys with the interrogation device by means of which communication between the dynamic object tag and the interrogation device may be encrypted and, a final step (2926) of communicating product information stored on an electronic storage module of the dynamic object tag to the interrogation device over the secure communication channel. In some embodiments of the invention, the method may include a further step of receiving updated product information from an authorized interrogation device, the updated information being stored in the electronic storage module.

Figure 21:
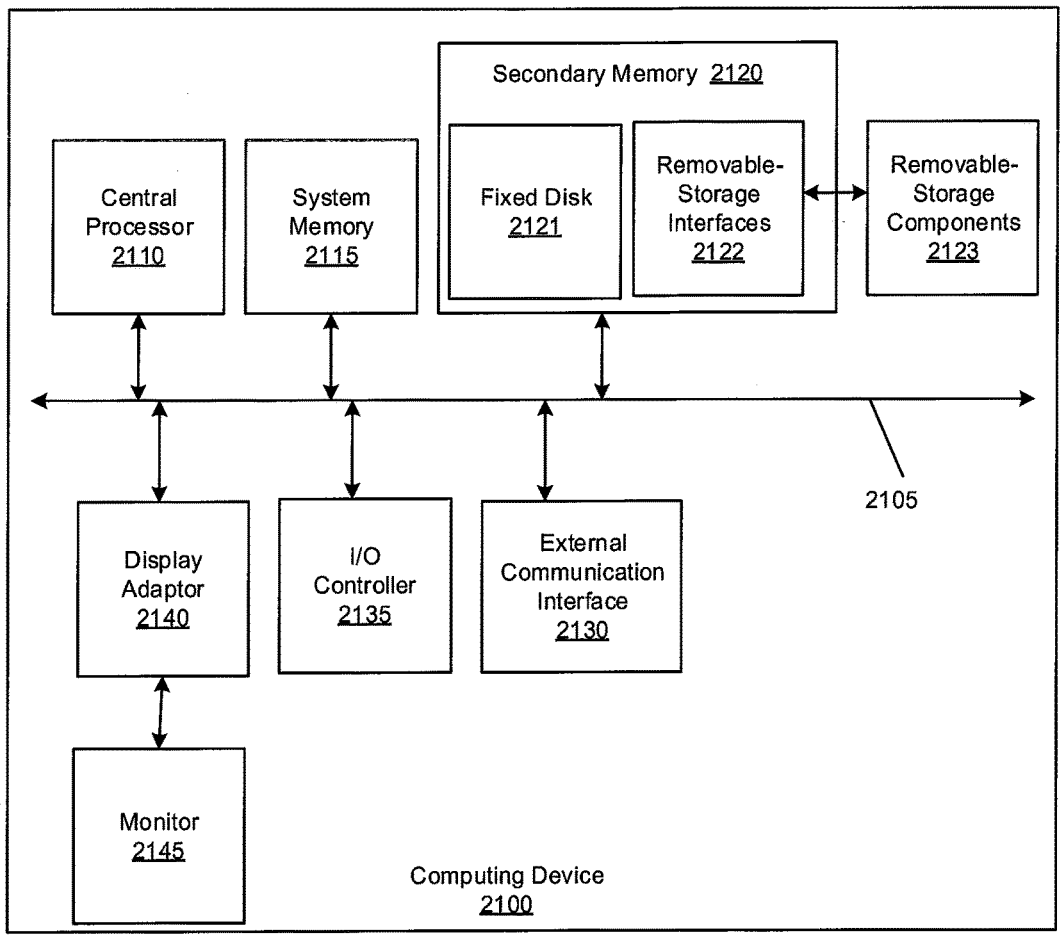
FIG. 21 illustrates an example of a computing device in which various aspects of the disclosure may be implemented; and, FIG. 22 shows a block diagram of a communication device that may be used in embodiments of the disclosure.

FIG. 21 illustrates an example of a computing device (2100) in which various aspects of the disclosure may be implemented. The computing device (2100) may be suitable for storing and executing computer program code. The various participants and elements in the previously described system diagrams may use any suitable number of subsystems or components of the computing device (2100) to facilitate the functions described herein.

The computing device (2100) may include subsystems or components interconnected via a communication infrastructure (2105) (for example, a communications bus, a crossover bar device, or a network). The computing device (2100) may include at least one central processor (2110) and at least one memory component in the form of computer-readable media.

The memory components may include system memory (2115), which may include read only memory (ROM) and random access memory (RAM). A basic input/output system (BIOS) may be stored in ROM. System software may be stored in the system memory (2115) including operating system software.

The memory components may also include secondary memory (2120). The secondary memory (2120) may include a fixed disk (2121), such as a hard disk drive, and, optionally, one or more removable-storage interfaces (2122) for removable-storage components (2123).

The removable-storage interfaces (2122) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (2122) may also be in the form of ports or sockets for interfacing with other forms of removable-storage components (2123) such as a flash memory drive, external hard drive, or removable memory chip, etc.

The computing device (2100) may include an external communications interface (2130) for operation of the computing device (2100) in a networked environment enabling transfer of data between multiple computing devices (2100). Data transferred via the external communications interface (2130) may be in the form of signals, which may be electronic, electromagnetic, optical, radio, or other types of signal.

The external communications interface (2130) may enable communication of data between the computing device (2100) and other computing devices including servers and external storage facilities. Web services may be accessible by the computing device (2100) via the communications interface (2130).

The external communications interface (2130) may also enable other forms of communication to and from the computing device (2100) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (2110).

A computer program product may be provided by a non-transient computer-readable medium, or may be provided via a signal or other transient means via the communications interface (2130).

Interconnection via the communication infrastructure (2105) allows a central processor (2110) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (2100) either directly or via an I/O controller (2135). These components may be connected to the computing device (2100) by any number of means known in the art, such as a serial port.

One or more monitors (2145) may be coupled via a display or video adapter (2140) to the computing device (2100).

Figure 22:
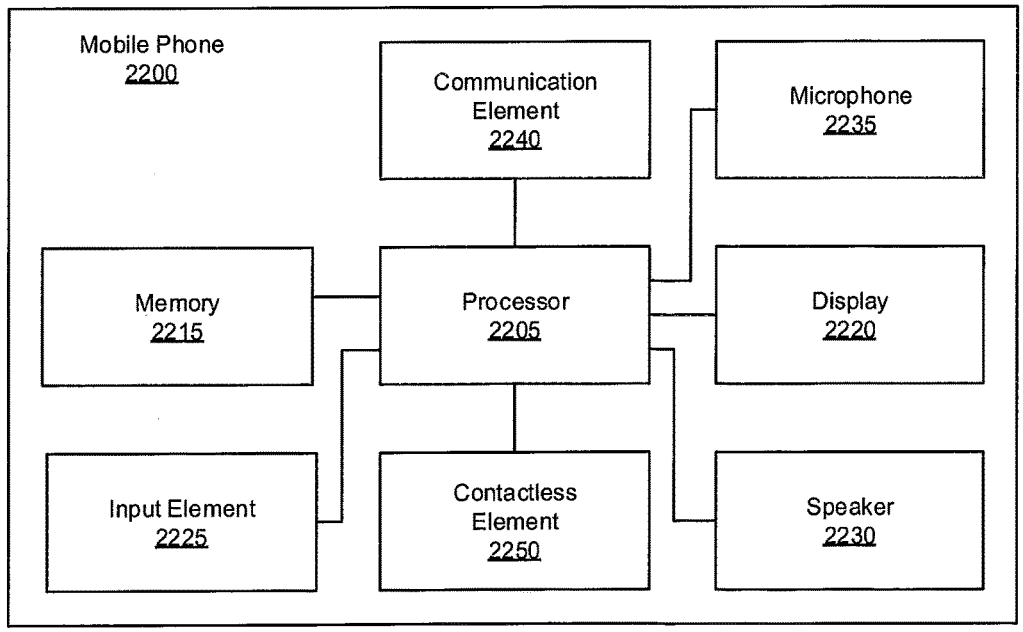

FIG. 22 shows a block diagram of a communication device (2200) that may be used in embodiments of the disclosure. The communication device (2200) may be a cell phone, a feature phone, a smart phone, a satellite phone, or a computing device having a phone capability.

The communication device (2200) may include a processor (2205) (e.g., a microprocessor) for processing the functions of the communication device (2200) and a display (2220) to allow a user to see the phone numbers and other information and messages. The communication device (2200) may further include an input element (2225) to allow a user to input information into the device (e.g., input buttons, touch screen, etc.), a speaker (2230) to allow the user to hear voice communication, music, etc., and a microphone (2235) to allow the user to transmit his or her voice through the communication device (2200).

The processor (2210) of the communication device (2200) may connect to a memory (2215). The memory (2215) may be in the form of a computer-readable medium that stores data and, optionally, computer-executable instructions.

The communication device (2200) may also include a communication element (2240) for connection to communication channels (e.g., a cellular telephone network, data transmission network, Wi-Fi network, satellite-phone network, Internet network, Satellite Internet Network, etc.). The communication element (2240) may include an associated wireless transfer element, such as an antenna.

The communication element (2240) may include a subscriber identity module (SIM) in the form of an integrated circuit that stores an international mobile subscriber identity and the related key used to identify and authenticate a subscriber using the communication device (2200). One or more subscriber identity modules may be removable from the communication device (2200) or embedded in the communication device (2200).

The communication device (2200) may further include a contactless element (2250), which is typically implemented in the form of a semiconductor chip (or other data storage element) with an associated wireless transfer element, such as an antenna. The contactless element (2250) may be associated with (e.g., embedded within) the communication device (2200) and data or control instructions transmitted via a cellular network may be applied to the contactless element (2250) by means of a contactless element interface (not shown). The contactless element interface may function to permit the exchange of data and/or control instructions between mobile device circuitry (and hence the cellular network) and the contactless element (2250).

The contactless element (2250) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (2200) and an interrogation device. Thus, the communication device (2200) may be capable of communicating and transferring data and/or control instructions via both a cellular network and near field communications capability.

The data stored in the memory (2215) may include: operation data relating to the operation of the communication device (2200), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (2200) to selected receivers.

The communication device (2200) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for identifying a product, the method being conducted at an interrogation device having a unique digital user identifier, and comprising the steps of:

exchanging dynamic authentication parameters with a dynamic object tag to establish a secure communication channel with the dynamic object tag, wherein the dynamic object tag comprises (a) a communication module and (b) a hardware security module, the hardware security module comprising (i) a public processing unit in communication with the communication module, and (ii) a secure processing unit that is only exposed to the public processing unit, and comprises a cryptoprocessor and a secure memory storage including a cryptographic key storage, wherein one or both of a physical separation and a logical separation is provided between the secure processing unit and the public processing unit, wherein one or both of the logical and physical separation creates a division in hardware roles to protect the secure processing unit, and wherein the public processing unit is configured to serve as a gatekeeper or a firewall to ensure that unauthorized or unwanted communications are not sent to the secure processing unit;

requesting product information including at least a product identifier from the dynamic object tag; and, receiving the requested product information over the secure communication channel.

2. The method as claimed in claim 1, wherein the method includes a further step of displaying the requested product information on a display screen of the interrogation device.

3. The method of claim 1, wherein the method includes a further step of communicating the received product information and user identifier to a remotely accessible server.

4. The method as claimed in claim 3, wherein the method includes a further step of receiving, from the remotely accessible server, an incentive to be offered to the user to incentivize a purchase of the product and/or one or more associated products, the incentive having been calculated based at least on the product identifier, a user profile, and a predetermined incentive strategy.

5. The method of claim 1, wherein the method includes a further step of transmitting a recommendation in respect of the product to one or more other interrogation devices, the recommendation including at least the product identifier, having been obtained from the dynamic object tag of the product by the recommending interrogation device, and a user identifier corresponding to the recommending interrogation device.

6. The method as claimed in claim 5, wherein the method includes further steps of receiving a recommendation in respect of the product from one or more recommending interrogation devices, storing the recommendation in a recommendation list, detecting when a stored recommendation is acted upon and, upon such detection, communicating an action notification to a remotely accessible server, the action notification including at least the product and user identifiers.

7. The method as claimed in claim 1, wherein the dynamic object tag includes a power harvesting component for powering the hardware security module and the communication module.

8. The method as claimed in claim 1, wherein at least some of the product information received over the secure communication channel is in-field rewritable information or data stored in a secure memory storage of the secure processing unit.

9. The method as claimed in claim 1, wherein exchanging dynamic authentication parameters with the dynamic object tag includes the hardware security module establishing a handshake with the interrogation device to exchange variable encryption keys and unique identifiers, wherein each response by the dynamic object tag to the interrogation device is dynamic and unique.

10. The method as claimed in claim 1, wherein exchanging dynamic authentication parameters includes the hardware security module exchanging a sequential counter and one or more authentication codes.

11. The method as claimed in claim 10, wherein the one or more authentication codes are at least partially recalculated by the interrogation device upon each successful interrogation of the dynamic object tag, the recalculated authentication codes being communicated back to the hardware security module over the secure communication channel for storage in the secure memory storage of the secure processing unit and used during a subsequent interrogation.

12. The method as claimed in claim 1, wherein the interrogation device includes a hardware security module configured to establish the secure communication channel with the hardware security module of the dynamic object tag.

13. The method as claimed in claim 1, wherein the product information includes one or more of a group of: a unique product identifier; product attributes written to the secure memory storage of the dynamic object tag at a time of manufacture; product attributes updated by an authorized interrogation device; and/or product attributes updated by events experienced by the product.

14. The method as claimed in claim 1, wherein at least some of the product information received over the secure communication channel is stored in the secure memory storage of the secure processing unit; and
the product information is rewritable by the interrogation device, such that the product information may be updated by the interrogation device during a lifetime of the product.

15. The method as claimed in claim 1, wherein the dynamic object tag includes one or more sensors for sensing events experienced by the product.

16. The method as claimed in claim 15, wherein the dynamic object tag includes one or more actuators for activating a response to events experienced by the product.

17. The method as claimed in claim 1, wherein the dynamic object tag is disposed in a tamper evidencing closure for a product container, the tamper evidencing closure comprising a body configured to be secured over and seal an opening of the container, the tamper evidencing closure including at least one sensor being in electrical communication with the dynamic object tag and operable to detect an event intimating a compromise of an integrity of the product and to communicate a detection of the event to the dynamic object tag, the dynamic object tag in turn being operable to store the detection of the event and to communicate the detection of the event to the interrogation device over the secure communication channel.

18. The method as claimed in claim 1, wherein the dynamic object tag is secured to a storage medium for storing digital data, the dynamic object tag being configured to provide read access to the interrogation device such that the digital data is communicated to the interrogation device over the secure communication channel.

19. The method as claimed in claim 18, wherein the digital data is stored on the storage medium in an encrypted format, the dynamic object tag being operable to decrypt the stored data and forward the decrypted data to the interrogation device over the secure communication channel.

20. The method as claimed in claim 18, wherein the data is stored on the storage medium in an encrypted format, the dynamic object tag forwarding the encrypted data to the interrogation device over the secure communication channel for decryption and interpretation.

21. The method as claimed in claim 1, wherein the secure communication channel is established over a wireless communication or Ethernet interface on the interrogation device and/or dynamic object tag.

22. The method as claimed in claim 1, wherein the dynamic object tag includes one or more electrophoretic ink (E-ink) regions, the method further comprising:
transmitting, by the interrogation device, instructions to the dynamic object tag over the secure communication channel to selectively expose and obscure selective electrophoretic ink regions.

23. The method as claimed in claim 4, wherein the predetermined incentive strategy is based on one or more of a group of: a marketing strategy, a retailer's or manufacturer's analytics, and a consumer economic value.

24. The method as claimed in claim 1, wherein the public processing unit further comprises:
a first communication interface for communicating with the communication module of the dynamic object tag; and
a second communication interface for communicating with the secure processing unit, wherein requests to exchange information between the first communication interface and second communication interface are managed and responded to by a processor of the public processing unit.

25. The method as claimed in claim 24, wherein the processor of the public processing unit runs an operating system for managing functionality and operations of the hardware security module, the functionality and operations managed by the operating system including one or more of:
responding to product information requests received from an interrogation device via the communication module;
sending encryption and decryption requests to the secure processing unit;
sending requests to the secure processing unit to create or verify MAC or hash values for at least a portion of messages sent to and from the communication module;
providing certificates for applications;
storing encrypted communications history; and
managing commands and information exchanges between the first and second communication interface.

26. The method as claimed in claim 1, wherein the secure memory storage of the secure processing unit comprises a data storage separate from the cryptographic key storage and comprises the product information, and wherein contents of the cryptographic key storage are never transmitted outside of the secure processing unit and are inaccessible by the public processing unit.

27. The method as claimed in claim 26, wherein the public processing unit of the hardware security module is configured to:
receive, from the communication module, a request from the interrogation device;
send the request to the secure processing unit;
determine that the secure communication channel is no longer operational; and
terminate communications with the communication module based on a determination that the secure communication channel is no longer operational.

* * * * *